(12) United States Patent
Negishi

(10) Patent No.: US 8,757,029 B2
(45) Date of Patent: Jun. 24, 2014

(54) STRAIN WAVE GEARING AND ROBOTIC ARM

(75) Inventor: Mahito Negishi, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 13/079,736

(22) Filed: Apr. 4, 2011

(65) Prior Publication Data

US 2011/0245006 A1   Oct. 6, 2011

(30) Foreign Application Priority Data

Apr. 6, 2010   (JP) ................................ 2010-087482

(51) Int. Cl.
*F16H 35/00* (2006.01)

(52) U.S. Cl.
USPC ............................................. 74/640; 74/411

(58) Field of Classification Search
USPC .................................................... 74/640, 411
See application file for complete search history.

(56) References Cited

U.S. PATENT DOCUMENTS

| | | | | |
|---|---|---|---|---|
| 2,954,205 | A * | 9/1960 | Musser ................... | 251/129.12 |
| 3,091,979 | A * | 6/1963 | Jennings et al. ................ | 74/640 |
| 3,101,009 | A * | 8/1963 | Musser ........................... | 74/640 |
| 3,187,605 | A * | 6/1965 | Stiff ................................ | 74/640 |
| 3,196,713 | A * | 7/1965 | Robinson ........................ | 74/640 |
| 3,427,898 | A * | 2/1969 | Mayer ............................. | 74/640 |
| 4,425,822 | A * | 1/1984 | Marschner et al. ............. | 74/640 |
| 4,524,639 | A * | 6/1985 | Carlson ........................... | 74/640 |
| 4,601,216 | A * | 7/1986 | Inoue et al. ..................... | 74/640 |
| 5,715,732 | A * | 2/1998 | Takizawa et al. ............... | 74/640 |
| 5,720,101 | A * | 2/1998 | Foley et al. .................. | 29/893.3 |
| 5,984,048 | A * | 11/1999 | Kiyosawa et al. ........... | 184/6.12 |
| 6,202,508 | B1 * | 3/2001 | Takizawa ........................ | 74/640 |
| 6,318,210 | B1 * | 11/2001 | Kiyosawa ........................ | 74/640 |
| 7,409,891 | B2 * | 8/2008 | Takemura ....................... | 74/640 |
| 7,752,939 | B2 * | 7/2010 | Ono ........................... | 74/490.03 |
| 2007/0039414 | A1 * | 2/2007 | Takemura ....................... | 74/640 |
| 2007/0204723 | A1 * | 9/2007 | Saito ............................... | 74/640 |
| 2008/0060473 | A1 * | 3/2008 | Li .................................... | 74/640 |
| 2008/0173130 | A1 * | 7/2008 | Zhang et al. .................... | 74/640 |
| 2010/0236351 | A1 * | 9/2010 | Ono ........................... | 74/490.01 |

FOREIGN PATENT DOCUMENTS

| | | |
|---|---|---|
| JP | 54-035630 | 3/1979 |
| JP | S61-011047 U | 1/1986 |
| JP | S63-053340 A | 3/1988 |
| JP | 64-021248 A | 1/1989 |
| JP | H04-048346 Y | 11/1992 |
| JP | 05-280593 A | 10/1993 |

* cited by examiner

*Primary Examiner* — Troy Chambers
*Assistant Examiner* — Valentin Craciun
(74) *Attorney, Agent, or Firm* — Canon USA Inc IP Division

(57) ABSTRACT

Provided is a strain wave gearing having a high stiffness and no limitation imposed on rotation, and a robotic arm including the strain wave gearing. A strain wave gearing includes an electric motor and a strain wave gearing reducer. The strain wave gearing reducer includes: an outer ring member including a first internal gear; a pair of second internal gears each having internal teeth formed along an inner periphery thereof, and the pair of second internal gears differing from the first internal gear in number of teeth; a flexible gear; and a cam member, which distorts the flexible gear in a radial direction to cause the flexible gear to engage with the first internal gear and the pair of second internal gears. The pair of second internal gears is fixed to a pair of fixing plates coupled to each other by a shaft penetrating the cam member.

1 Claim, 14 Drawing Sheets

--Prior Art--

--Prior Art--

--Prior Art--

STRAIN WAVE GEARING AND ROBOTIC ARM

BACKGROUND OF THE INVENTION

1. Field of the Invention

The present invention relates to a strain wave gearing including an electric motor and a strain wave gearing reducer for reducing a rotational speed of the electric motor, and also relates to a robotic arm including the strain wave gearing.

2. Description of the Related Art

There is known a strain wave gearing including an electric motor and a strain wave gearing reducer (so-called harmonic drive (registered trademark)). The strain wave gearing of this type is provided to each joint of links of a robotic arm so as to pivot and rotate the links. The strain wave gearing reducer includes a thin, cylindrical, flexible external gear having external teeth and called flex spline, an internal gear having internal teeth and called circular spline, and a cam member called wave generator (see Japanese Patent Application Laid-Open No. S63-053340, Japanese Utility Model Publication No. H04-048346, and Japanese Utility Model Application Laid-Open No. S61-011047). The wave generator is formed into an elliptical shape so that the flex spline is deformed into an elliptical shape and pressed against the circular spline.

FIGS. 13A, 13B, and 13C are sectional views of three strain wave gearing reducers. First, one of the strain wave gearing reducers is described with reference to FIG. 13A. A stator 101 of an electric motor is provided to a fixed shaft 100, and a rotor 102 is arranged along an outer periphery of the stator 101. A wave generator 103 is fixed to the rotor 102. Along an outer periphery of the wave generator 103, an open end of a flex spline 104 is mounted, and the other end of the flex spline 104 is supported so as to rotate freely relative to the fixed shaft 100. Along an outer periphery of the flex spline 104, a circular spline 105 fixed to a cover 106 is arranged. The flex spline 104 is distorted by the wave generator 103 into an elliptical shape to engage with the circular spline 105 at two positions, that is, both ends along the major axis of the ellipse. The rotation of the wave generator 103 constructed by the rotor 102 of the electric motor causes a relative rotation between the flex spline 104 and the circular spline 105, and a rotation output is extracted by a flange 107 fixed to one end of the flex spline 104.

Next, another strain wave gearing reducer is described with reference to FIG. 13B. The strain wave gearing reducer includes two circular splines 111 and 112 having different numbers of teeth. A flex spline 113 is provided on an inner side of the two circular splines 111 and 112, and there is provided a wave generator 115 for distorting and deforming the flex spline 113 into an elliptical shape so that the flex spline 113 is rotated in the elliptical shape. The rotation of the wave generator 115 causes a change in engagement positions between the flex spline 113 and the two circular splines 111 and 112. When the engagement positions change during one revolution, the circular spline 111 rotates relative to the circular spline 112 with the shift corresponding to the difference in number of teeth between the two circular splines 111 and 112. In this strain wave gearing reducer, one of the two circular splines 111 and 112 is used as a fixed shaft while the other is used as an output shaft.

Next, still another strain wave gearing reducer is described with reference to FIG. 13C. The strain wave gearing reducer includes one elliptical wave generator 121 fixed to an input shaft 120, and one flex spline 122 having a tooth form on an outer periphery thereof. The strain wave gearing reducer further includes a first circular spline 123, which is fixed to an arm 123a provided in a part of an outer periphery thereof and engages with the flex spline 122, and a pair of second circular splines 125 and 126, which engage with the flex spline 122 on both sides of the first circular spline 123. In this strain wave gearing reducer, the pair of second circular splines 125 and 126 are coupled to each other by a coupling bar 124, and the pair of second circular splines 125 and 126 rotate relative to the first circular spline 123. The coupling bar 124 is used as an output shaft.

An industrial robotic arm is structured by connecting multiple joints in series. In each joint, the strain wave gearing including the electric motor and the strain wave gearing reducer is disposed, and hence the mechanical model is a model in which stiffnesses of the respective strain wave gearing reducers are connected in series. Therefore, unless a strain wave gearing reducer having a sufficiently high stiffness is used, the stiffness of the entire robotic arm lacks. If the stiffness of the robotic arm is low, the natural frequency of the robotic arm decreases, resulting in decrease in accuracy, increase in stabilization period, decrease in maximum operation speed, and other such performance degradation. The use of the strain wave gearing reducer having a high stiffness is an important factor for the robotic arm.

In the strain wave gearing reducer illustrated in FIG. 13A, a rotational force applied to a portion between the circular spline 105 and the flange 107 is also applied to the flex spline 104 provided therebetween. When the rotational force is applied to the flex spline 104, the flex spline 104 being a flexible elastic member is torsionally deformed by the rotational force, and the flange 107 serving as the output shaft rotates by the torsional deformation. In the strain wave gearing reducer illustrated in FIG. 13A, the flex spline 104 serves as the output shaft, and hence the flex spline 104 is likely to be torsionally deformed, which causes the decrease in stiffness of the strain wave gearing reducer.

In the strain wave gearing reducer illustrated in FIG. 13B, the circular spline 112 situated in one end portion of the flex spline 113 rotates relative to the circular spline 111 situated in the other end portion. Hence, forces are applied to the external teeth of the flex spline 113 in opposite directions in a part engaging with the circular spline 111 and in a part engaging with the circular spline 112. Because the forces are applied to the respective end portions of the flex spline 113 in opposite directions, the flex spline 113 is likely to be torsionally deformed by the forces, which causes the decrease in stiffness of the strain wave gearing reducer.

In the strain wave gearing reducer illustrated in FIG. 13C, the two circular splines 125 and 126 situated in both end portions of the flex spline 122 rotate relative to the circular spline 123 situated in the center portion of the flex spline 122. The two circular splines 125 and 126 rotate in the same direction, and hence forces are applied to the end portions of the flex spline 122 in the same direction. Accordingly, the direction of the force applied to the center portion of the flex spline 122 is opposite to that of the force applied to each end portion, but the directions of the forces applied to both the end portions are the same. Thus, the flex spline 122 is not likely to be torsionally deformed, which suppresses the decrease in stiffness of the strain wave gearing reducer. In this strain wave gearing reducer, the two circular splines 125 and 126 are coupled to each other by the coupling bar 124 extending outside. Hence, the coupling bar 124 hits against the arm 123a supporting the circular spline 123, and accordingly no further revolution can be made than one revolution. When the strain wave gearing including the strain wave gearing reducer having such structure is used for the robotic arm, the movable range of the links is reduced.

SUMMARY OF THE INVENTION

In view of the above, the present invention provides a strain wave gearing having a high stiffness and no limitation imposed on rotation, and provides a robotic arm including the strain wave gearing.

The present invention provides a strain wave gearing, including: an electric motor; an outer ring member for rotation output having a tubular outer ring portion, and a first internal gear which is provided so as to protrude into an inner side of the outer ring portion and has internal teeth formed along an inner periphery of the first internal gear; a pair of second internal gears arranged on the inner side of the outer ring portion and on both end sides of the first internal gear, the pair of second internal gears each having internal teeth formed along an inner periphery of the pair of second internal gears, and a number of the internal teeth of the each second internal gear differing from a number of the internal teeth of the first internal gear; a flexible gear having external teeth formed along an outer periphery of the flexible gear, the flexible gear formed of a tubular flexible member which is arranged on an inner side of the first internal gear and the pair of second internal gears; a tubular cam member configured to distort the flexible gear in a radial direction so as to partially engage the flexible gear with the first internal gear and the pair of second internal gears, the tubular cam member rotated by a rotational force transmitted from the electric motor so as to move engagement positions in a circumferential direction so that a relative rotation between the first internal gear and the pair of second internal gears is generated; a pair of fixing plates, to each of which a corresponding second internal gear of the pair of second internal gears is fixed; and a coupling member penetrating the tubular cam member and coupling the pair of fixing plates to each other.

Further, the present invention provides a strain wave gearing, including: an electric motor; an outer ring member for rotation output having a tubular outer ring portion, and an internal gear which is provided so as to protrude into an inner side of the outer ring portion and has internal teeth formed along an inner periphery of the internal gear; a flexible gear having an external gear which has external teeth formed along an outer periphery of the external gear and is arranged on an inner side of the internal gear, the flexible gear formed of a tubular flexible member which has a pair of flange portions arranged on both end sides of the external gear, a number of the external teeth of the external gear differing from a number of the internal teeth of the internal gear; a tubular cam member configured to distort the flexible gear in a radial direction so as to partially engage the external gear with the internal gear, the tubular cam member rotated by a rotational force transmitted from the electric motor so as to move engagement positions in a circumferential direction so that a relative rotation between the internal gear and the external gear is generated; a pair of fixing plates, to each of which a corresponding flange portion of the pair of flange portions is fixed; and a coupling member penetrating the tubular cam member and coupling the pair of fixing plates to each other.

According to the present invention, both the end portions of the flexible gear are supported by the pair of second internal gears fixed to the pair of fixing plates, and hence the outer ring member including the first internal gear rotates with respect to the pair of second internal gears. At this time, a force from the first internal gear of the outer ring member is applied to the center portion of the flexible gear. To both the end portions of the flexible gear, however, forces are applied in the same direction, which is opposite to that of the force applied to the center portion, with the result that the torsional deformation of the flexible gear is suppressed and the stiffness is enhanced. In addition, the pair of fixing plates are coupled to each other by the coupling member penetrating the tubular cam member, and hence the outer ring member does not hit against the coupling member due to the rotation of the outer ring member, with the result that more than one revolution can be made for the outer ring member through the first internal gear.

According to the present invention, both the end portions of the flexible gear are constructed by the pair of flange portions, and the pair of flange portions are fixed to the pair of fixing plates, respectively. Accordingly, the outer ring member including the internal gear rotates with respect to the flexible gear including the external gear. At this time, the flexible gear is fixed to the pair of fixing plates with a simply supported beam structure, with the result that the torsional deformation of the flexible gear is suppressed and the stiffness is enhanced. In addition, the pair of fixing plates are coupled to each other by the coupling member penetrating the tubular cam member. Accordingly, the outer ring member does not hit against the coupling member due to the rotation of the outer ring member, with the result that more than one revolution can be made for the outer ring member through the internal gear.

Further features of the present invention will become apparent from the following description of exemplary embodiments with reference to the attached drawings.

DESCRIPTION OF THE EMBODIMENTS

Hereinbelow, exemplary embodiments of the present invention are described in detail with reference to the attached drawings.

First Embodiment

Figure 1:
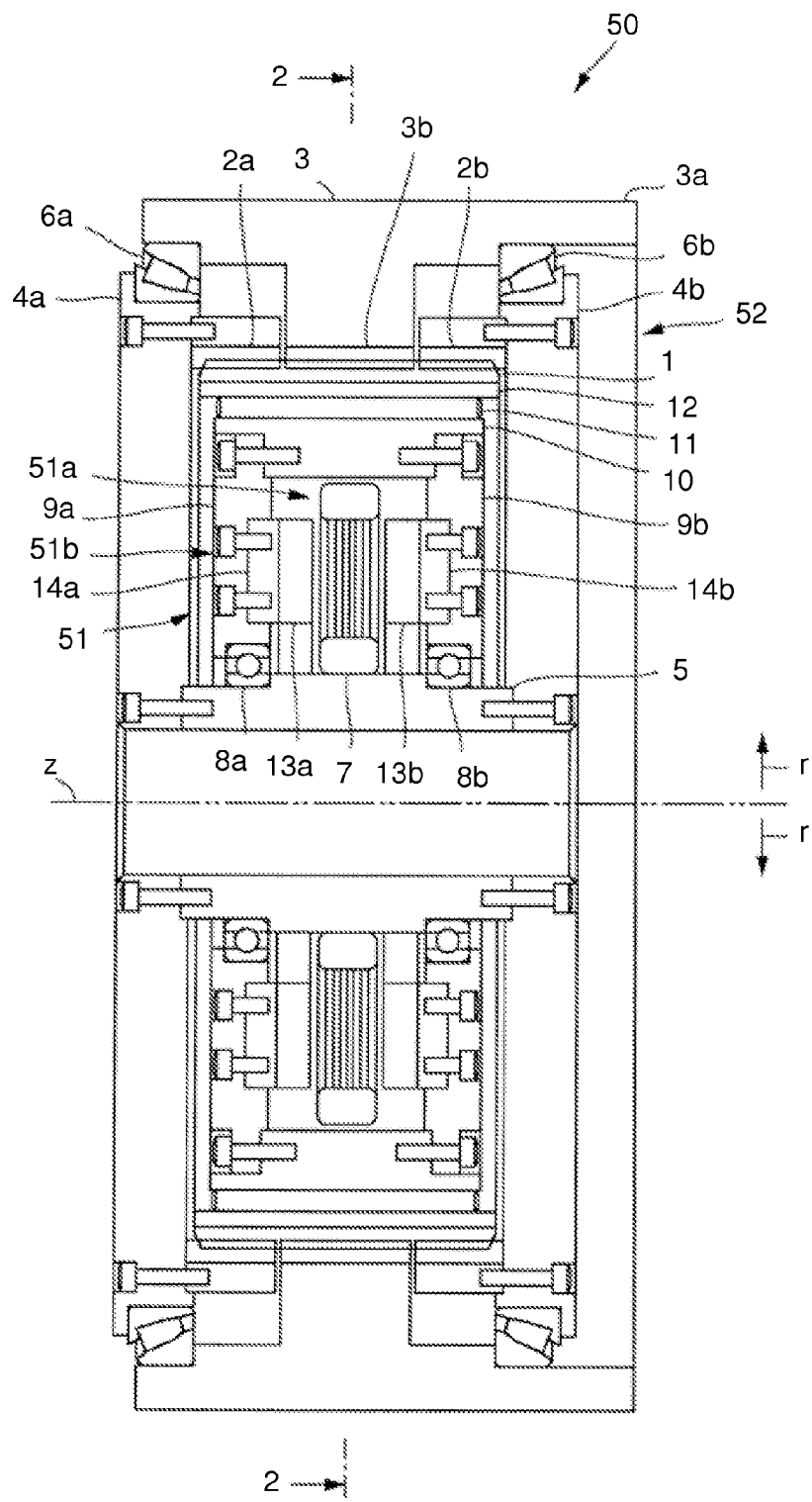
FIG. 1 is a schematic view illustrating schematic structure of a strain wave gearing according to a first embodiment of the present invention.
Figure 2:
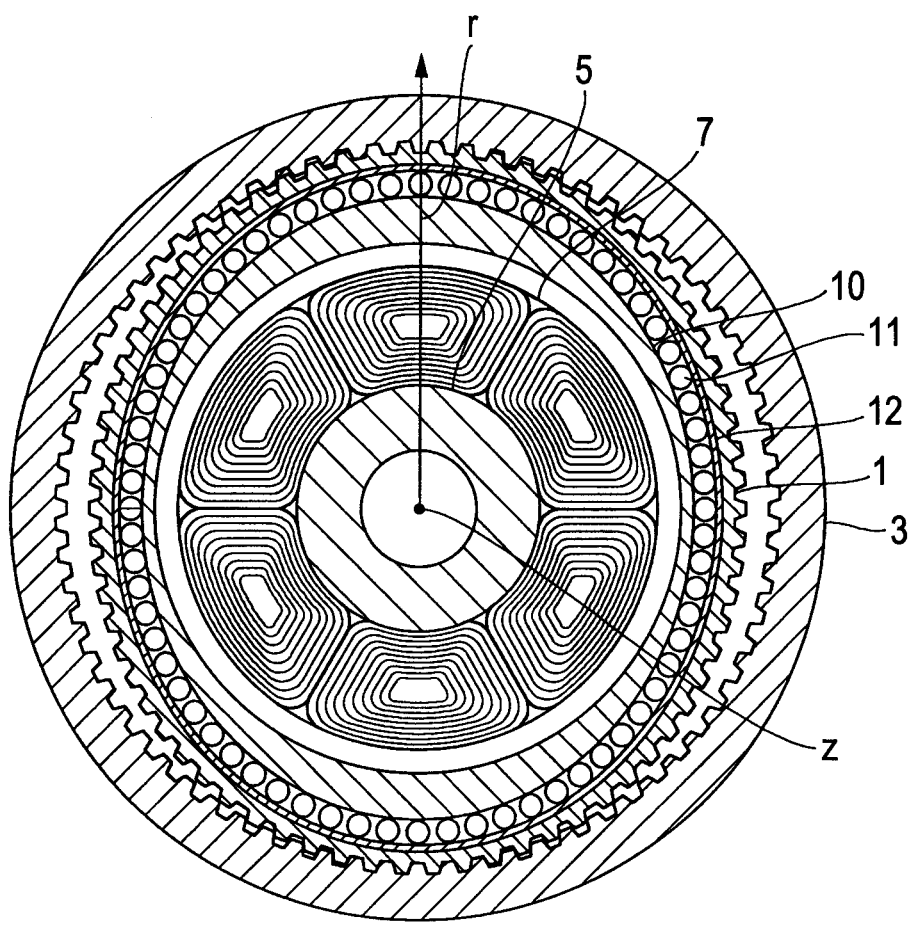
FIG. 2 is a schematic sectional view taken along the line 2-2 of FIG. 1.

FIG. 1 is a schematic view illustrating schematic structure of a strain wave gearing according to a first embodiment of the present invention. FIG. 2 is a schematic sectional view taken along the line 2-2 of FIG. 1. Hereinbelow, structure of a strain wave gearing reducer is described. As illustrated in FIG. 1, a strain wave gearing 50 includes one electric motor 51 and a strain wave gearing reducer 52. The strain wave gearing 50 is integrally structured by building the electric motor 51 into the strain wave gearing reducer 52. The electric motor 51 is a brushless DC motor.

Hereinbelow, specific structure is described. The strain wave gearing 50 includes an outer ring member 3 serving as a so-called circular spline. The outer ring member 3 includes a tubular (in this embodiment, cylindrical) outer ring portion 3a, and an annular (in this embodiment, toric) first internal gear 3b, which is provided so as to protrude into an inner side of the outer ring portion 3a and has internal teeth formed along an inner periphery thereof. The outer ring member 3 is formed of a rigid member. The outer ring member 3 is a rotation output member that rotates about a rotational axis (in FIG. 1, two-dot chain line z; hereinafter, referred to as "z-axis"). The outer ring member 3 reduces the speed of input, that is, rotation of the electric motor 51 and outputs.

A pair of second internal gears 2a and 2b is arranged on the inner side of the outer ring portion 3a of the outer ring member 3 and on both end sides of the first internal gear 3b. Each of the second internal gears 2a and 2b has internal teeth formed along an inner periphery thereof. In other words, in a direction parallel to the z-axis direction, the one second internal gear 2a is disposed on one end side of the first internal gear 3b and the other second internal gear 2b is disposed on the other end side of the first internal gear 3b. The pair of second internal gears 2a and 2b is formed into an annular (in this embodiment, toric) shape. The pair of second internal gears 2a and 2b is each formed so as to have a rotational axis concentric with that of the first internal gear 3b at the z-axis and have the same radius of the inner periphery as the first internal gear 3b. However, the pair of second internal gears 2a and 2b is different from the first internal gear 3b in number of internal teeth formed along the inner periphery. For example, the first internal gear 3b has 100 internal teeth formed therearound while the second internal gears 2a and 2b each have 98 internal teeth formed therearound. The second internal gear 2a and the second internal gear 2b are set to have the same structure and the same number of teeth.

A flexible gear 1 serving as a so-called flex spline is arranged on an inner side of the first internal gear 3b and the pair of second internal gears 2a and 2b. The flexible gear 1 has external teeth formed along an outer periphery thereof. The flexible gear 1 is formed of a flexible member, and includes a thin cylindrical portion and external teeth formed along an outer periphery of the thin cylindrical portion. The flexible gear 1 may be distorted to be deformed in a radial direction r orthogonal to the z-axis direction. The flexible gear 1 is set so as to have substantially the same width as a sum of the width of the first internal gear 3b and the widths of the pair of second internal gears 2a and 2b. Further, the flexible gear 1 has its external teeth formed in parallel to the z-axis direction. Hence, the flexible gear 1 is arranged so that a center portion of the flexible gear 1 engages with the first internal gear 3b and both end portions of the flexible gear 1 engage with the pair of second internal gears 2a and 2b.

As illustrated in FIG. 2, a cam member 10 serving as a so-called wave generator is arranged on an inner side of the flexible gear 1 through the intermediation of an outer rim 12 and a bearing 11. The cam member 10 has its outer periphery formed into an elliptical shape. Specifically, the bearing 11 is arranged on an outer side of the cam member 10 and the outer rim 12 is arranged on an outer side of the bearing 11. The cam member 10 rotates relative to the flexible gear 1 through the intermediation of the bearing 11 and the outer rim 12, and distorts the flexible gear 1 in the radial direction r, to thereby cause the flexible gear 1 to partially engage with the first internal gear 3b and the pair of second internal gears 2a and 2b. In other words, the flexible gear 1 is distorted by the cam member 10 into an elliptical shape to engage with the first internal gear 3b and the pair of second internal gears 2a and 2b at two engagement positions along the major axis of the ellipse. In this case, the cam member 10 to be manufactured has its aspect ratio and size adjusted so that the flexible gear 1 engages with the three internal gears 2a, 2b, and 3b at the two positions, that is, in the direction of the major axis of the ellipse. The cam member 10 is formed of a tubular rigid member having its inner periphery formed into a circular shape. The bearing 11 includes multiple cylindrical rollers or multiple balls. The bearing 11 allows the outer rim 12 to rotate along the outer periphery of the cam member 10, that is, along the ellipse.

The electric motor 51 is arranged on an inner side of the cam member 10. Specifically, the electric motor 51 includes a stator 51a and a rotor 51b, and the stator 51a and the rotor 51b are arranged on the inner side of the cam member 10. The stator 51a includes multiple (in FIG. 2, six) coils 7 arranged into an annular shape about the z-axis. The stator 51a is formed into an annular shape. The rotor 51b includes multiple permanent magnets 13a and 13b arranged on both sides of the stator 51a (coils 7), yokes 14a and 14b to which the permanent magnets 13a and 13b are fixed, respectively, and motor housings 9a and 9b to which the yokes 14a and 14b are fixed, respectively. The pair of motor housings 9a and 9b is formed into an annular shape, and their annular outer rim portions are coupled and fixed to the inner periphery of the cam member 10. With this structure, the cam member 10 is fixed to the rotor 51b and a rotational force of the electric motor 51 is transmitted to the cam member 10, with the result that the cam member 10 rotates about the z-axis integrally with the rotor 51b. Because of the rotation of the cam member 10, the engagement positions between the first internal gear 3b and the flexible gear 1 and between the pair of second internal gears 2a and 2b and the flexible gear 1 move in the circumferential direction, which may cause a relative rotation between the first internal gear 3b and the pair of second internal gears 2a and 2b with the shift corresponding to the difference in number of teeth. For example, the case where the first internal gear 3b has 100 internal teeth formed therearound while the second internal gears 2a and 2b each have 98 internal teeth formed therearound is described. In this case, one revolution of the cam member 10 causes the first internal gear 3b to rotate relative to the pair of second internal gears 2a and 2b with the shift of two teeth (difference in number of teeth), that is, a 2/100 revolution. The reduction ratio is 1:50.

The electric motor 51 generates a rotational force by causing a current corresponding to a rotation position to flow through the coils 7. The rotation position of the rotor 51b is detected by a method of detecting positions of the magnets using a Hall element (not shown) or a method of directly detecting the positions using an encoder (not shown).

In the first embodiment, the strain wave gearing includes a pair of disc-like fixing plates 4a and 4b arranged on the inner side of the outer ring portion 3a. In the first embodiment, the pair of fixing plates 4a and 4b is formed into a toric shape with a through-hole formed in their center portion. The pair of fixing plates 4a and 4b is formed so that an outside diameter thereof substantially equals the diameter of each of the second internal gears 2a and 2b. The one second internal gear 2a is fixed to an outer circumferential portion of the one fixing plate 4a, while the other second internal gear 2b is fixed to an outer circumferential portion of the other fixing plate 4b. Accordingly, to the pair of fixing plates 4a and 4b, the corresponding second internal gears 2a and 2b are fixed, respectively. The pair of second internal gears 2a and 2b are arranged between the pair of fixing plates 4a and 4b.

The pair of fixing plates 4a and 4b is coupled to each other by a shaft 5 serving as a coupling member. Specifically, the shaft 5 is coupled to the pair of fixing plates 4a and 4b by means of bolts or the like. The shaft 5 is formed into a tubular shape, and is arranged so that a shaft center thereof conforms to the z-axis. In other words, the shaft 5 couples to each other inner circumferential portions of the pair of fixing plates 4a and 4b formed into an annular shape. Therefore, the shaft 5 is arranged on the inner side of the cam member 10 so as to penetrate the tubular cam member 10. In other words, the shaft 5 couples the pair of fixing plates 4a and 4b to each other through a space surrounded by the inner periphery of the cam member 10. Because the shaft 5 is formed into the tubular shape, electric wiring and other members may be provided through the inner space of the shaft 5. With the coupling structure of the pair of fixing plates 4a and 4b and the shaft 5, the pair of second internal gears 2a and 2b integrally rotate about the z-axis relative to the first internal gear 3b. In other words, the first internal gear 3b rotates about the z-axis relative to the pair of internal gears 2a and 2b. Specifically, the pair of second internal gears 2a and 2b, the pair of fixing plates 4a and 4b, and the shaft 5 constitute an inner ring member, and the outer ring member 3 rotates relative to the inner ring member. Bearings 6a and 6b are arranged between peripheral end surfaces of the pair of fixing plates 4a and 4b and an inner peripheral surface of the outer ring portion 3a of the outer ring member 3. In other words, the outer ring portion 3a of the outer ring member 3 is supported by the pair of fixing plates 4a and 4b through the intermediation of the bearings 6a and 6b. The pair of fixing plates 4a and 4b may be fixed to a fixed object (not shown), and at least one of the pair of fixing plates 4a and 4b is fixed to the fixed object (not shown).

The stator 51a formed into the annular shape is fixed to an outer periphery of the shaft 5. Bearings 8a and 8b are arranged between the shaft 5 and the rotor 51b (motor housings 9a and 9b) formed into the annular shape, and the rotor 51b rotates around the shaft 5 about the z-axis.

In the first embodiment, the strain wave gearing reducer 52 includes the cam member 10, the flexible gear 1, the outer ring member 3 including the first internal gear 3b, the pair of second internal gears 2a and 2b, the pair of fixing plates 4a and 4b, and the shaft 5. The strain wave gearing 50 is structured by building the electric motor 51 into the strain wave gearing reducer 52.

In the above-mentioned structure, when power is supplied to the coils 7 of the stator 51a of the electric motor 51, the rotor 51b including the permanent magnets 13a and 13b rotates, and accordingly the cam member 10 fixed to the motor housings 9a and 9b rotates. Because of the rotation of the cam member 10, the two engagement positions in the direction of the major axis of the ellipse, between the flexible gear 1 and the first internal gear 3b and between the flexible gear 1 and the pair of second internal gears 2a and 2b, rotate. One revolution of the cam member 10 causes a relative rotation between the first internal gear 3b and the pair of second internal gears 2a and 2b with the shift corresponding to the difference in number of teeth between the first internal gear 3b and the pair of second internal gears 2a and 2b. In a case where the fixing plate 4a (4b) is fixed to the fixed object (not shown), the pair of second internal gears 2a and 2b coupled thereto does not rotate with respect to the fixed object, but instead the first internal gear 3b rotates with respect to the fixed object at the reduction ratio that is set based on the difference in number of teeth. In a case where the outer ring member 3 including the first internal gear 3b is fixed to the fixed object (not shown), on the other hand, the outer ring member 3 does not rotate with respect to the fixed object, but instead the pair of second internal gears 2a and 2b rotates with respect to the fixed object.

Figure 3A:
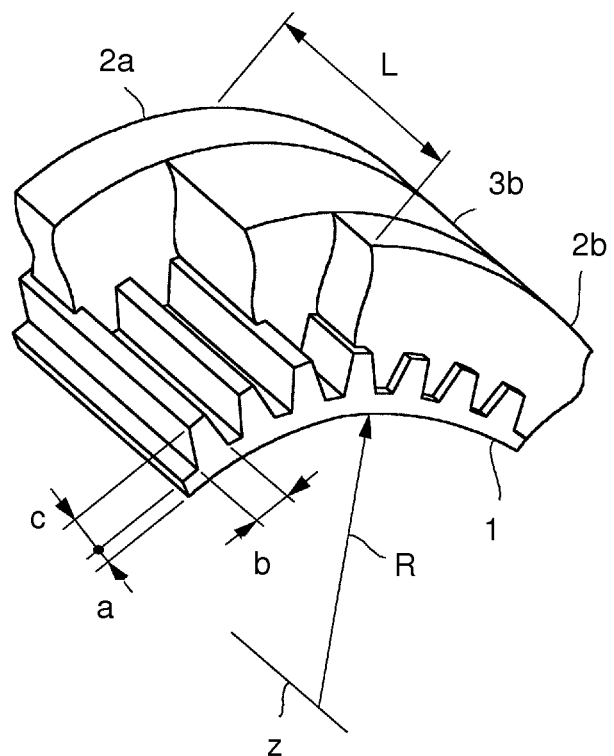
FIG. 3A is an explanatory view for stiffness calculation of the first embodiment, which illustrates an engaging state between a flexible gear and a first internal gear and between the flexible gear and a pair of second internal gears.
Figure 3B:
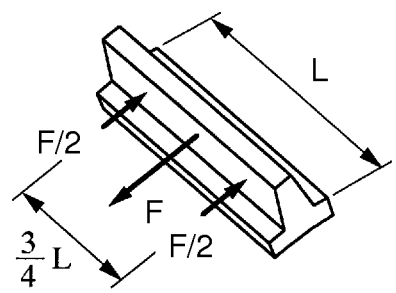
FIG. 3B is an explanatory view for the stiffness calculation of the first embodiment, which illustrates an external tooth of the flexible gear.

Next, calculation of a stiffness based on forces applied to the flexible gear 1 is described. FIGS. 3A and 3B are explanatory views for the stiffness calculation. FIG. 3A illustrates an engaging state between the flexible gear 1 and the first internal gear 3b and between the flexible gear 1 and the pair of second internal gears 2a and 2b arranged on both the sides of the first internal gear 3b. FIG. 3B illustrates the external tooth of the flexible gear 1.

The rotational force applied to the outer ring member 3 serving as an output shaft of the strain wave gearing reducer 52 is applied to the center portion of the flexible gear 1 engaging with the first internal gear 3b and to both the end portions of the flexible gear 1 engaging with the two second internal gears 2a and 2b, and acts in such a direction as to deform the flexible gear 1. In this case, the flexible gear 1 is supported by the two second internal gears 2a and 2b, and as illustrated in FIG. 3B, forces F/2 act on both the end portions of the flexible gear 1 in the same direction, which is opposite to that of a force F applied to the center portion of the external tooth of the flexible gear 1. The flexible gear 1 has so-called simply supported beam structure, and hence the stiffness is enhanced. Hereinbelow, the stiffness is specifically determined through calculation. The flexible gear 1 includes the thin cylindrical portion and the external teeth.

The stiffness of the strain wave gearing reducer is a ratio of the rotational force to a rotation angle according to the rotational force. Hereinbelow, the following symbols are used in mathematical expressions.

T: torque applied to the strain wave gearing reducer, R: radius of the flexible gear, F: force applied to the external tooth of the flexible gear (F=T/R), G: modulus of transverse elasticity of the flexible gear, E: modulus of longitudinal elasticity of the flexible gear, v: Poisson's ratio of the flexible gear, a: thickness of the thin cylindrical portion of the flexible gear, b: tooth width of the flexible gear, c: tooth height of the flexible gear, L: width of the flexible gear (length of the external tooth), n: number of engaging teeth.

In this case, it is assumed that the width of the first internal gear 3b in the center portion is L/2, and the width of each of the second internal gears 2a and 2b in both the side portions is L/4. When assuming that the center of the applied force corresponds to the center of the first internal gear 3b, the forces are applied as reaction forces from the second internal gears 2a and 2b on both sides to positions that are spaced apart at an interval of 3L/4. Accordingly, it may be considered as a bending problem of a beam in which both end portions of the flexible gear 1 are supported simply. Hereinbelow, the stiffness of the strain wave gearing reducer is considered separately for the case of the thin cylindrical portion and the case of the external tooth portion.

(1) Stiffness of Thin Cylindrical Portion

First Embodiment

First, a torsional stiffness of a circular pipe having an outside diameter of 2(R+a), an inside diameter of 2R, and a length of 3L/8 is considered. The torsional stiffness is assumed to be on both sides, and hence a doubled value of the torsional stiffness corresponds to a stiffness Knew1 of the thin cylindrical portion.

$$Knew1 = \frac{T}{\theta} \quad \text{(expression 1)}$$
$$= \frac{16\pi((R+a)^4 - R^4)G}{3L}$$
$$= \frac{8\pi((R+a)^4 - R^4)E}{3L(1+v)}$$

In this case, the following expression is used.

$$G = \frac{E}{2(1+v)}$$

(2) Stiffness of External Tooth

First Embodiment

The external tooth of the flexible gear 1 is considered as the bending problem of the simply supported beam of the interval of 3L/4, and hence a relationship expressed in the following expression is established when assuming that F represents an external force and x represents displacement.

$$\frac{F}{x} = \frac{64Ecb^3}{9L^3} \quad \text{(expression 2)}$$

When F is represented by the torque T applied in the case of the radius R and x is represented by a rotation angle θ in the case of the radius R, a stiffness Knew2 of one external tooth is expressed as follows.

$$Knew2 = \frac{T}{\theta} = \frac{64Ecb^3R^2}{9L^3} \quad \text{(expression 3)}$$

When assuming that n teeth engage, the stiffness of the strain wave gearing reducer of the first embodiment may be expressed as follows.

$$Knew = Knew1 + nKnew2 \quad \text{(expression 4)}$$
$$= \frac{\pi((R+a)^4 - R^4)E}{3L(1+v)} + \frac{64nEcb^3R^2}{9L^3}$$
$$= \frac{E}{L}\left(\frac{\pi((R+a)^4 - R^4)}{3(1+v)} + \frac{64ncb^3R^2}{9L^2}\right)$$

Figure 4A:
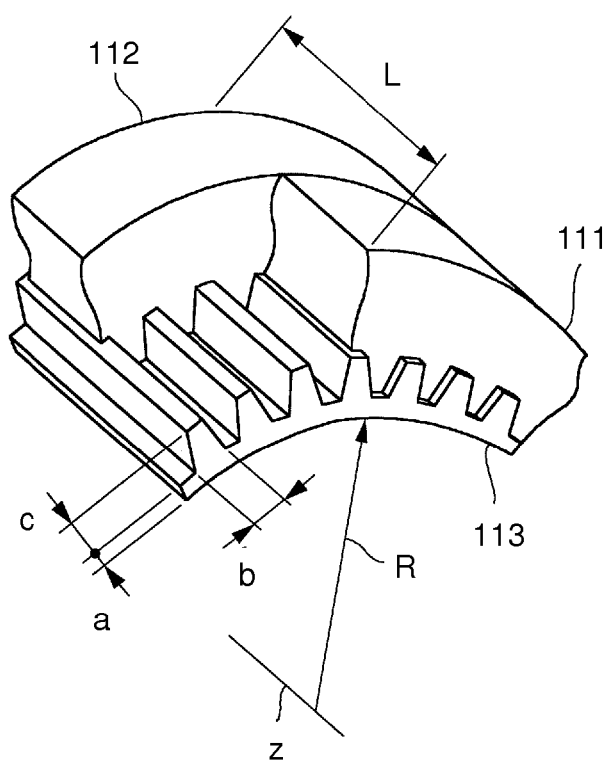
FIG. 4A is an explanatory view for stiffness calculation of a reference example, which illustrates an engaging state between a flex spline and two circular splines.
Figure 4B:
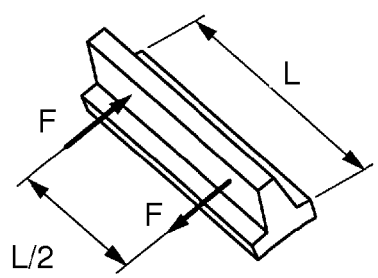
FIG. 4B is an explanatory view for the stiffness calculation of the reference example, which illustrates an external tooth of the flex spline.
Figure 13A:
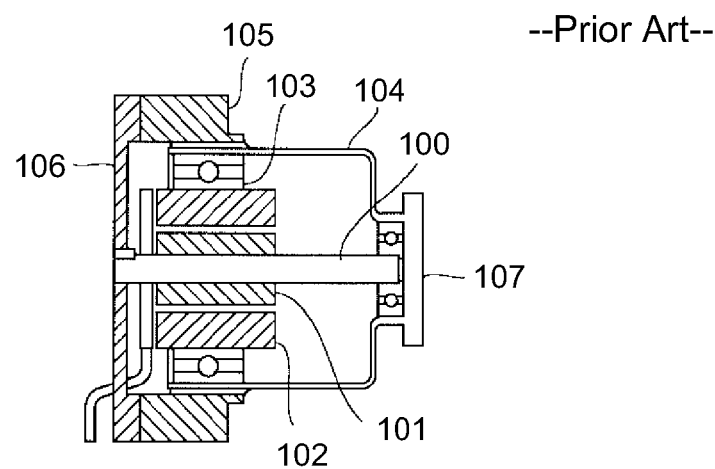
FIGS. 13A, 13B, and 13C are sectional views of three strain wave gearing reducers.
Figure 13B:
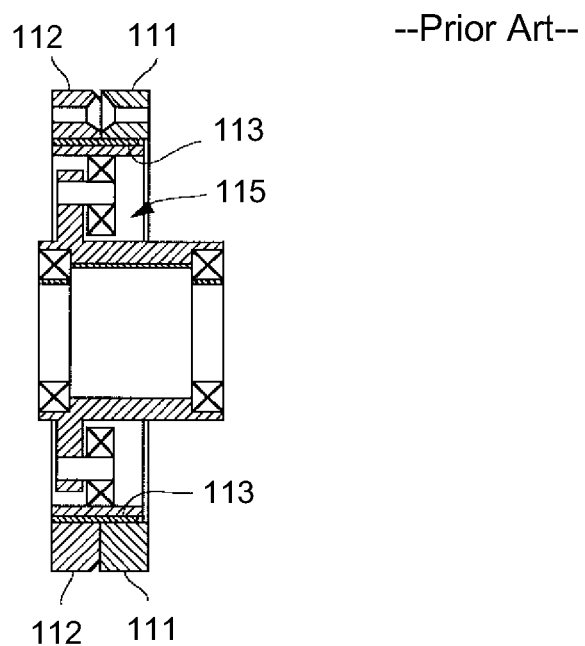
Figure 13C:
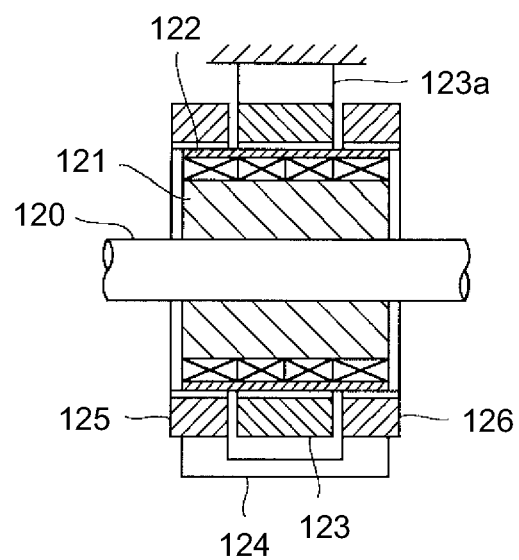

Next, as a reference example, the stiffness is calculated for the strain wave gearing reducer illustrated in FIG. 13B, in which the two circular splines 111 and 112 having different numbers of teeth engage with the flex spline 113. FIGS. 4A and 4B are explanatory views for the stiffness calculation. FIG. 4A illustrates an engaging state between the flex spline 113 and the two circular splines 111 and 112. FIG. 4B illustrates the external tooth of the flex spline 113. As illustrated in FIG. 4B, when assuming that the center of the force applied to the external tooth of the flex spline 113 corresponds to the center between the circular splines 111 and 112, forces are applied in opposite directions to positions that are spaced apart at an interval of L/2. The rotational force applied to the strain wave gearing reducer is applied to a portion between the two circular splines 111 and 112, and hence the flex spline 113 is deformed. In this case, the flex spline 113 has so-called cantilever structure, and hence has a low stiffness. Next, the stiffness is specifically determined through calculation. The stiffness of the strain wave gearing reducer is a ratio of a relative rotational force applied to the portion between the two circular splines 111 and 112 to a relative rotation angle due to the relative rotational force. As illustrated in FIG. 4A, the flex spline 113 includes a thin cylindrical portion having the thickness a, and external teeth each having the tooth width b and the tooth height c. The stiffness of the strain wave gearing reducer may be estimated by summing up the stiffness of the thin cylindrical portion and the stiffness of the external tooth portion.

(3) Stiffness of Thin Cylindrical Portion

Reference Example

A twist angle of a circular pipe having an outside diameter of 2(R+a), an inside diameter of 2R, and a length of L/2 may be calculated in terms of the strength of materials, and a stiffness Kold1 may be expressed as follows.

$$Kold1 = \frac{T}{\theta} = \frac{\pi((R+a)^4 - R^4)G}{L} = \frac{\pi((R+a)^4 - R^4)E}{2L(1+v)} \quad \text{(expression 5)}$$

(4) Stiffness of External Tooth

Reference Example

The external tooth of the flex spline 113 receives forces from the internal teeth of the two circular splines 111 and 112 held into contact with the flex spline 113. When assuming that the external tooth of the flex spline 113 is a simply supported beam of the length of L/2, the two forces applied to the flex spline 113 are on different lines of action, and hence there is no drag generated against the forces. Thus, it does not contribute to the stiffness of the strain wave gearing reducer.

In summary, a stiffness Kold of the strain wave gearing reducer in the reference example may be estimated by the following expression.

$$Kold = Kold1 = \frac{\pi((R+a)^4 - R^4)E}{2L(1+v)} \quad \text{(expression 6)}$$

Hereinabove, Expressions 1 to 6 are derived, and the first embodiment is now compared to the comparative example. First, comparison is made on the stiffness of the thin cylindrical portion. The stiffness of the first embodiment is Knew1, which is expressed in Expression 1, while the stiffness of the comparative example is Kold1, which is expressed in Expression 5. When a stiffness ratio therebetween is determined, all the symbols are canceled. The determined stiffness ratio is expressed as follows.

$$\frac{Knew1}{Kold1} = \frac{16}{3}$$

Even considering the thin cylindrical portion alone, the stiffness is expected to be enhanced to a value about five times as high as that of the comparative example.

Further, numerical values are assumed as follows: E=200 [GPa] (steel); v=0.3 (steel); R=20 [mm]; a=0.3 [mm]; b=0.5 [mm]; c=0.5 [mm]; L=10 [mm]; and n=30. Then, the numerical values are substituted for Expressions 4 and 6 to determine Knew and Kold. Then, Knew=20.62 [MNm/rad] and Kold=3.87 [MNm/rad].

Thus, according to the first embodiment, both the end portions of the flexible gear 1 are supported by the pair of second internal gears 2a and 2b fixed to the pair of fixing plates 4a and 4b. Hence, the outer ring member 3 including the first internal gear 3b rotates with respect to the pair of second internal gears 2a and 2b. At this time, as illustrated in FIG. 3B, the force F from the first internal gear 3b of the outer ring member 3 is applied to the center portion of the flexible gear 1, while to both the end portions of the flexible gear 1, the forces F/2 are applied in the same direction, which is opposite to that of the force applied to the center portion. As a result, the torsional deformation of the flexible gear 1 is suppressed even when the flexible gear 1 of the same size is used, and the stiffness can be enhanced to a value more than about five times as high as that of the comparative example. In addition, the pair of second internal gears 2a and 2b are fixed to the pair of fixing plates 4a and 4b, and the pair of fixing plates 4a and 4b are coupled to each other by the shaft 5 penetrating the tubular cam member 10. Hence, the outer ring member 3 does not hit against the shaft 5 due to the rotation of the outer ring member 3. As a result, more than one revolution can be made for the outer ring member 3 through the first internal gear 3b.

Further, in the electric motor 51, the stator 51a is arranged between the pair of fixing plates 4a and 4b and fixed to the shaft 5. The rotor 51b is arranged between the pair of fixing plates 4a and 4b and fixed to the inner periphery of the cam member 10. With this structure, the rotor 51b rotates integrally with the cam member 10. In the first embodiment, the arrangement of the stator 51a and the rotor 51b is devised so that the stator 51a and the rotor 51b are housed in an efficient way between the pair of fixing plates 4a and 4b, with the result that the device structure is reduced in size. Thus, when the strain wave gearing 50 is applied to a robotic arm (not shown), a small-size robot can be manufactured.

Second Embodiment

Figure 5:
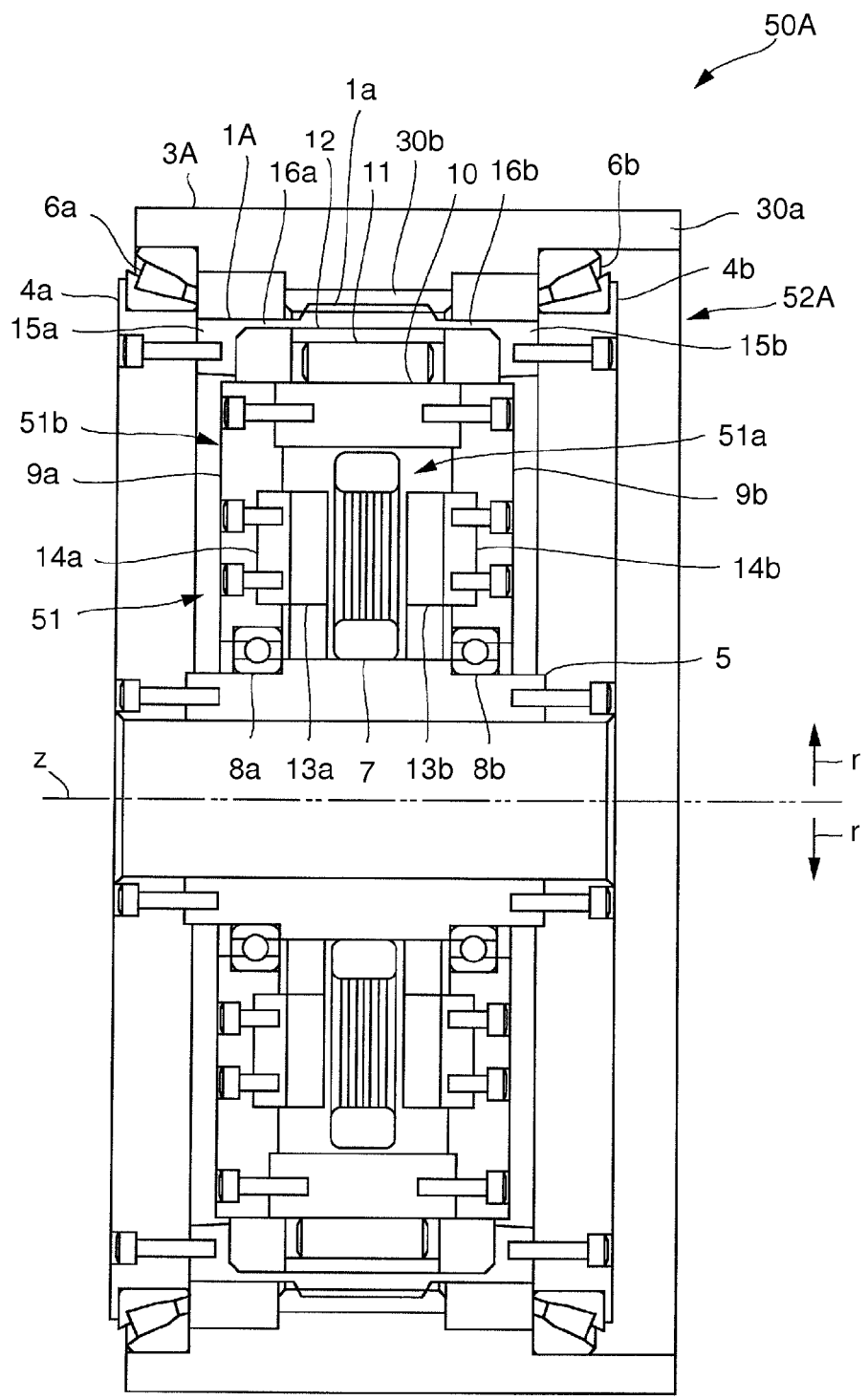
FIG. 5 is a schematic view illustrating schematic structure of a strain wave gearing according to a second embodiment of the present invention.

A strain wave gearing according to a second embodiment of the present invention is described. The second embodiment is different from the first embodiment in the structure of the strain wave gearing reducer. FIG. 5 is a schematic view illustrating schematic structure of the strain wave gearing according to the second embodiment of the present invention. In the second embodiment, the same components as those in the first embodiment are represented by the same reference symbols, and description thereof is omitted herein. As illustrated in FIG. 5, a strain wave gearing 50A includes an outer ring member 3A serving as a so-called circular spline. The outer ring member 3A includes a tubular (in this embodiment, cylindrical) outer ring portion 30a, and an annular (in this embodiment, toric) internal gear 30b, which is provided so as to protrude into an inner side of the outer ring portion 30a and has internal teeth formed along an inner periphery thereof. The outer ring member 3A is formed of a rigid member. The outer ring member 3A is a rotation output member that rotates about the rotational axis (in FIG. 5, two-dot chain line z, that is, z-axis). The outer ring member 3A reduces the speed of input, that is, the rotation of the electric motor 51 and outputs.

A flexible gear 1A serving as a so-called flex spline is arranged on an inner side of the outer ring member 3A. The flexible gear 1A is formed of a flexible member, and includes an external gear 1a, which is formed in the center portion of the flexible gear 1A and has external teeth, which are to be engaged with the internal teeth of the internal gear 30b, formed along an outer periphery thereof. The external gear 1a is set to have a different number of teeth from that of the internal gear 30b.

Figure 6A:
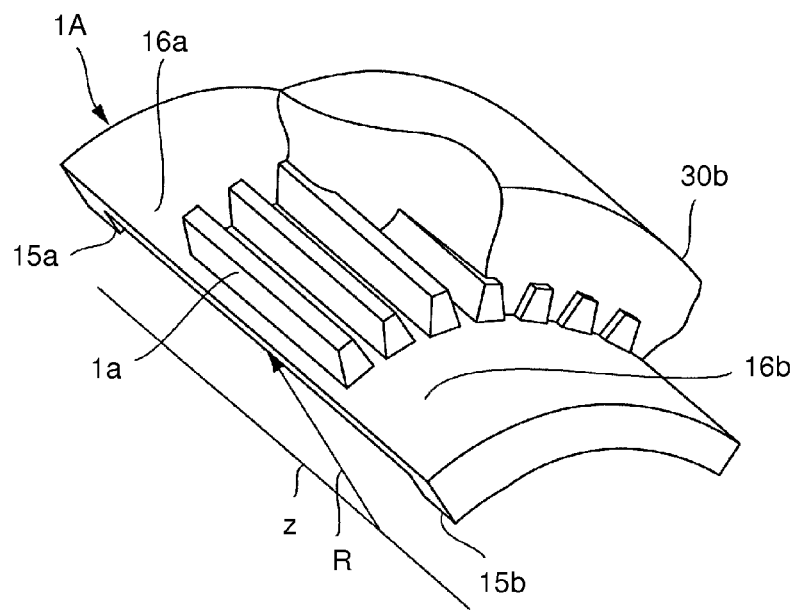
FIG. 6A is an explanatory view illustrating a support state of a flexible gear of the second embodiment.

As illustrated in FIG. 6A, the flexible gear 1A includes a pair of thin plate-like deformable portions 16a and 16b, which are connected to both ends of the external gear 1a and can be distorted to be deformed. The flexible gear 1A further includes a pair of flange portions 15a and 15b, which are respectively connected to the other ends of the deformable portions 16a and 16b on a side opposite to the one ends at which the external gear 1a is connected, and are thicker than the deformable portions 16a and 16b. The external gear 1a, the pair of deformable portions 16a and 16b, and the pair of flange portions 15a and 15b are formed into a tubular shape.

The one deformable portion 16a is formed between the external gear 1a and the one flange portion 15a, while the other deformable portion 16b is formed between the external gear 1a and the other flange portion 15b. The one flange portion 15a out of the pair of flange portions 15a and 15b is fixed to the one fixing plate 4a, while the other flange portion 15b out of the pair of flange portions 15a and 15b is fixed to the other fixing plate 4b. Accordingly, as illustrated in FIG. 5, the flexible gear 1A is fixed to the pair of fixing plates 4a and 4b in an unrotatable manner. The cam member 10 rotates relative to the flexible gear 1A through the intermediation of the bearing 11 and the outer rim 12 to partially press the external gear 1a of the flexible gear 1A and partially distort the pair of deformable portions 16a and 16b to deform the pair of deformable portions 16a and 16b. As a result, the external gear 1a partially protrudes in the radial direction r. Accordingly, the flexible gear 1A can be distorted to be deformed in the radial direction r.

The cam member 10 distorts the flexible gear 1A in the radial direction r through the intermediation of the bearing 11 and the outer rim 12, to thereby cause the flexible gear 1A to partially engage with the internal gear 30b. In other words, the flexible gear 1A is distorted by the cam member 10 into an elliptical shape so that the internal gear 30b engages with the external gear 1a of the flexible gear 1A at two engagement positions along the major axis of the ellipse. In this case, the cam member 10 to be manufactured has its aspect ratio and size adjusted so that the external gear 1a of the flexible gear 1A engages with the internal gear 30b of the outer ring member 3A at the two positions, that is, in the direction of the major axis of the ellipse. The cam member 10 is formed of a tubular rigid member having its inner periphery formed into a circular shape.

The cam member 10 is fixed to the rotor 51b and the rotational force of the electric motor 51 is transmitted to the cam member 10, with the result that the cam member 10 rotates about the z-axis integrally with the rotor 51b. Accordingly, because of the rotation of the cam member 10, the engagement positions between the internal gear 30b of the outer ring member 3A and the external gear 1a of the flexible gear 1A move in the circumferential direction, which may cause a relative rotation between the internal gear 30b and the external gear 1a with the shift corresponding to the difference in number of teeth. For example, the case where the internal gear 30b has 100 internal teeth formed therearound while the external gear 1a has 98 external teeth formed therearound is described. In this case, one revolution of the cam member 10 causes the internal gear 30b to rotate relative to the external gear 1a with the shift of two teeth (difference in number of teeth), that is, a 2/100 revolution. The reduction ratio is 1:50. In this case, the number of teeth of the external gear 1a may be smaller than the number of teeth of the internal gear 30b. With this structure, the outer ring member 3A rotates in the same direction as the rotation direction of the rotor 51b of the electric motor 51. In a case where the outer ring member 3A may rotate in a direction opposite to the rotation direction of the rotor 51b of the electric motor 51, the number of teeth of the external gear 1a may be larger than the number of teeth of the internal gear 30b.

In the second embodiment, similarly to the first embodiment, the pair of fixing plates 4a and 4b are coupled by the shaft 5. The electric motor 51 is housed between the pair of fixing plates 4a and 4b in the same way as in the first embodiment. Because the shaft 5 is formed into the tubular shape, electric wiring and other members may be provided through the inner space of the shaft 5. With the coupling structure of the pair of fixing plates 4a and 4b and the shaft 5, the flexible gear 1A including the external gear 1a, which is coupled to the pair of fixing plates 4a and 4b, integrally rotates about the z-axis relative to the internal gear 30b. In other words, the outer ring member 3A including the internal gear 30b rotates about the z-axis relative to the flexible gear 1A including the external gear 1a. Specifically, the flexible gear 1A, the pair of fixing plates 4a and 4b, and the shaft constitute an inner ring member, and the outer ring member 3A rotates relative to the inner ring member. The pair of fixing plates 4a and 4b may be fixed to a fixed object (not shown), and at least one of the pair of fixing plates 4a and 4b is fixed to the fixed object (not shown).

In the second embodiment, a strain wave gearing reducer 52A includes the cam member 10, the flexible gear 1A, the outer ring member 3A including the internal gear 30b, the pair of fixing plates 4a and 4b, and the shaft 5. The strain wave gearing 50A is structured by building the electric motor 51 into the strain wave gearing reducer 52A.

In the above-mentioned structure, when power is supplied to the coils 7 of the stator 51a of the electric motor 51, the rotor 51b including the permanent magnets 13a and 13b rotates, and accordingly the cam member 10 fixed to the motor housings 9a and 9b rotates. Because of the rotation of the cam member 10, the two engagement positions in the direction of the major axis of the ellipse, between the external gear 1a of the flexible gear 1A and the internal gear 30b of the outer ring member 3A, rotate. One revolution of the cam member 10 causes a relative rotation between the external gear 1a and the internal gear 30b with the shift corresponding to the difference in number of teeth between the external gear 1a and the internal gear 30b. In a case where the fixing plate 4a (4b) is fixed to the fixed object (not shown), the flexible gear 1A coupled thereto does not rotate with respect to the fixed object, but instead the outer ring member 3A (internal gear 30b) rotates with respect to the fixed object. In a case where the outer ring member 3A is fixed to the fixed object (not shown), on the other hand, the outer ring member 3A does not rotate with respect to the fixed object, but instead the flexible gear 1A and the fixing plates 4a and 4b coupled thereto rotate with respect to the fixed object.

Figure 6B:
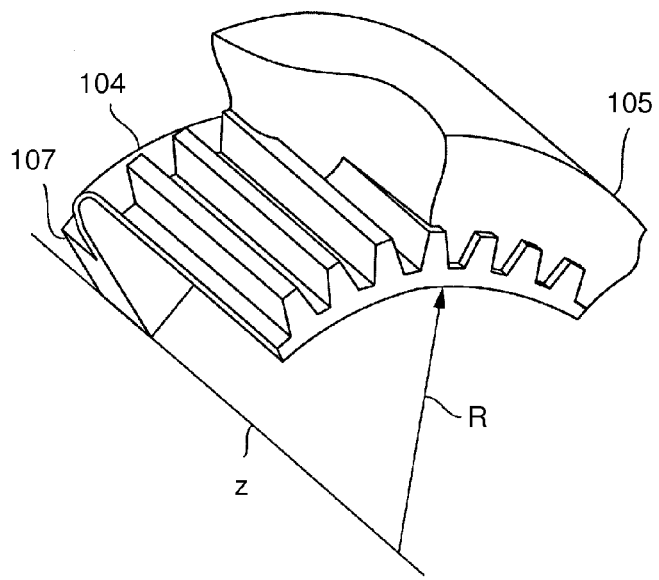
FIG. 6B is an explanatory view illustrating a support state of a flexible gear of a reference example.

Description is given by referring to a reference example illustrated in FIG. 6B. FIG. 6B illustrates the flex spline 104 having cantilever structure corresponding to FIG. 13A. The rotational force applied to the strain wave gearing reducer is applied to a portion between the flange 107 and the circular spline 105. Accordingly, the flex spline 104 is supported on one side, and receives the rotational force at an end on the other side. In this case, the flex spline 104 has the so-called cantilever structure, and hence the stiffness is low.

In contrast, in the flexible gear 1A of the second embodiment, as illustrated in FIG. 6A, the flange portions 15a and 15b are formed integrally with the external gear 1a through the intermediation of the deformable portions 16a and 16b, respectively. As illustrated in FIG. 5, the flange portions 15a and 15b are fixed to the fixing plates 4a and 4b, respectively. Hence, the rotational force applied to the strain wave gearing reducer is applied to a portion between the two flange portions 15a and 15b and the internal gear 30b. Accordingly, the two end portions of the flexible gear 1A are supported, and the flexible gear 1A receives the rotational force in the center portion. In this case, the flexible gear 1A has so-called simply supported beam structure, and hence the stiffness is enhanced. The fact that the stiffness is enhanced with the simply supported beam structure is as described in the calculation of the above-mentioned first embodiment.

As described above, according to the second embodiment, both the end portions of the flexible gear 1A are constructed by the pair of tubular flange portions 15a and 15b, and the pair of flange portions 15a and 15b is fixed to the pair of fixing plates 4a and 4b, respectively. Accordingly, the outer ring member 3A including the internal gear 30b rotates with respect to the flexible gear 1A including the external gear 1a. The flexible gear 1A is fixed to the pair of fixing plates 4a and 4b with the simply supported beam structure, with the result that the torsional deformation of the flexible gear 1A is suppressed and the stiffness is enhanced. In addition, the pair of fixing plates 4a and 4b are coupled to each other by the shaft 5 penetrating the tubular cam member 10. Hence, the outer ring member 3A does not hit against the shaft 5 due to the rotation of the outer ring member 3A. As a result, more than one revolution can be made for the outer ring member 3A through the internal gear 30b.

In the electric motor 51, the stator 51a is arranged between the pair of fixing plates 4a and 4b and fixed to the shaft 5. The rotor 51b is arranged between the pair of fixing plates 4a and 4b and fixed to the inner periphery of the cam member 10. With this structure, the rotor 51b rotates integrally with the cam member 10. In the second embodiment, the arrangement of the stator 51a and the rotor 51b is devised so that the stator 51a and the rotor 51b are housed in an efficient way between the pair of fixing plates 4a and 4b, with the result that the device structure is reduced in size. Thus, when the strain wave gearing 50A is applied to a robotic arm (not shown), a small-size robot can be manufactured.

Third Embodiment

Figure 7A:
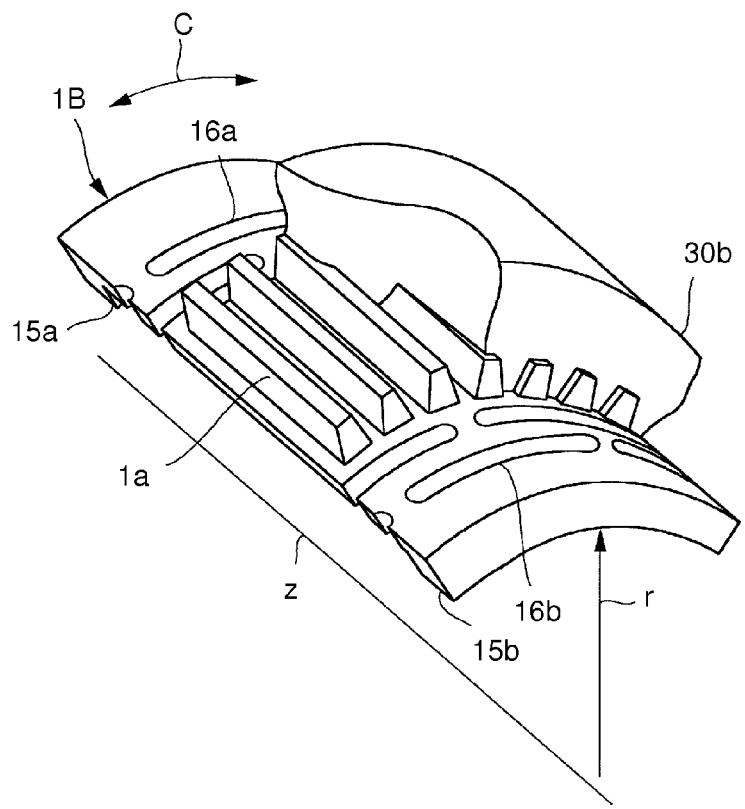
FIG. 7A is an explanatory view of a flexible gear of a strain wave gearing according to a third embodiment of the present invention, which illustrates a partial schematic view of the flexible gear.
Figure 7B:
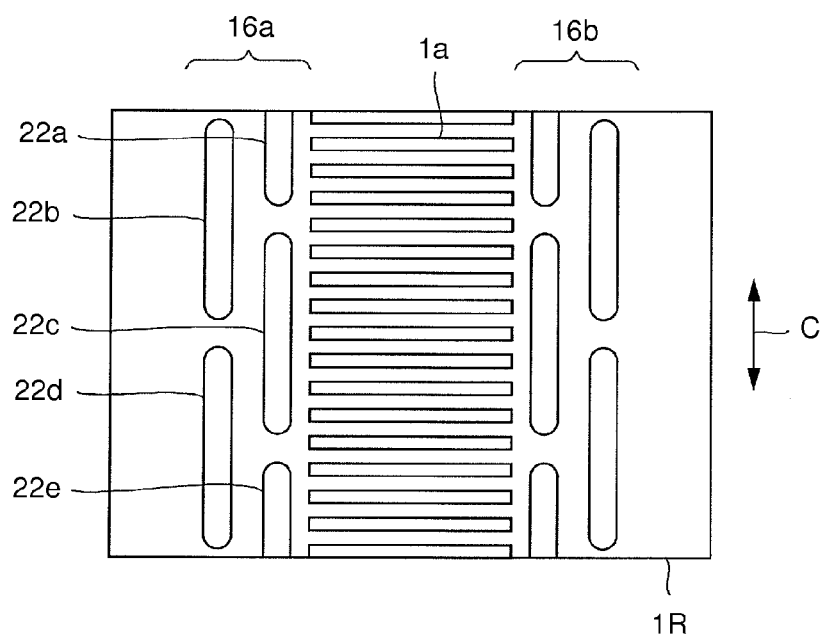
FIG. 7B is an explanatory view of the flexible gear of the strain wave gearing according to the third embodiment of the present invention, which illustrates a development view of the flexible gear.

A strain wave gearing according to a third embodiment of the present invention is described. The third embodiment is different from the second embodiment in the structure of the deformable portions of the flexible gear, and other components of the third embodiment are the same as those in the second embodiment. FIGS. 7A and 7B are explanatory views of a flexible gear of the strain wave gearing according to the third embodiment of the present invention. FIG. 7A is a partial schematic view of the flexible gear. FIG. 7B is a development view of the flexible gear. As illustrated in FIGS. 7A and 7B, deformable portions 16a and 16b of a flexible gear 1B are thin plate-like members connecting the external gear 1a to the flange portions 15a and 15b, respectively. In the plate-like portions, multiple slits 22a to 22e extending in a circumferential direction (arrow C direction) of the flexible gear 1B are formed. The multiple slits 22a to 22e are through-holes. The slits 22a to 22e are formed in the deformable portions 16a and 16b so as to be arranged in a zigzag pattern in a direction orthogonal to the circumferential direction C and the radial direction r (direction parallel to the length direction of the external tooth of the external gear 1a).

In the flexible gear 1B, the flange portions 15a and 15b at both ends of the flexible gear 1B are fixed to the fixing plates 4a and 4b, respectively (see FIG. 5). Accordingly, the flexible gear 1B is in the state of being fixed at both the end portions thereof. Hence, the center portion of the flexible gear 1B is pressed by the cam member 10 (see FIG. 5) and the deformable portions 16a and 16b are deformed. As a result, the flexible gear 1B is deformed into an elliptical shape so as to partially protrude. Therefore, a repeated stress is applied to the deformable portions 16a and 16b.

In the third embodiment, the deformable portions 16a and 16b having the slits 22a to 22e formed therein are provided between both the end portions of the flexible gear 1B and the center portion of the flexible gear 1B, and hence a long beam approximately connects the portions therebetween, with the result that it is easy to deform in the radial direction r. In other words, the deformable portions 16a and 16b are easy to deform in an out-of-plane direction. According to the strength of materials, the deformation in the out-of-plane direction is bending deformation, and hence rapidly increases with the cube of the length. However, a deformation in an in-plane direction or a deformation in a tensile direction increases only with the first power of the length. Accordingly, the ratio between stiffness in the in-plane direction and stiffness in the out-of-plane direction of the flexible gear 1B may be adjusted depending on the design of dimensions of the holes of the slits 22a to 22e. For example, the flexible gear may be designed to have low stiffness in the out-of-plane direction and high stiffness in the in-plane direction. The force for deforming the external gear 1a of the flexible gear 1B into an elliptical shape is a force in the out-of-plane direction, and the rotational force applied to the strain wave gearing reducer is a force in the in-plane direction of the flexible gear 1B. Thus, by designing the flexible gear 1B so as to have low stiffness in the out-of-plane direction and high stiffness in the in-plane direction, the repeated stress generated by the elliptical deformation can be alleviated with no penalty in the stiffness of the strain wave gearing reducer, with the result that a longer life is expected. When the slits 22a to 22e are formed in the deformable portions 16a and 16b of the flexible gear 1B along a direction in which the rotational force is applied, that is, the circumferential direction C of the flexible gear 1B, the deformation that may occur by the torsional torque decreases.

Note that, the number of slits to be formed may be one, in the third embodiment, multiple slits 22a to 22e are formed. By forming the multiple slits 22a to 22e as described above, the effect of alleviating the stress further increases.

Further, in the third embodiment, the flexible gear 1B is supported with so-called simply supported beam structure, and hence a high stiffness can be achieved. Even when the slits 22a to 22e are formed, the stiffness decrease is slight. In other words, each of the slits 22a to 22e only needs to be designed to have such a size that the superiority of the stiffness is not lost. Because the stress applied to the flexible gear 1B can be alleviated, a small-size, long-life device can be realized.

Figure 8:
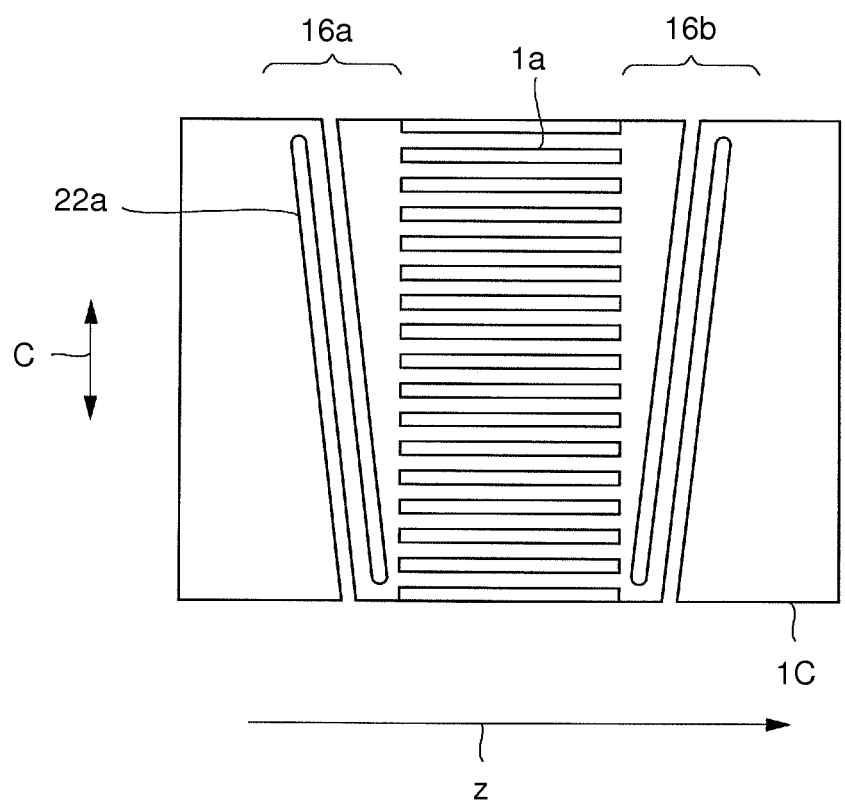
FIG. 8 is a development view illustrating a flexible gear according to another embodiment of the present invention.

As illustrated in FIG. 8, the flexible gear may be a flexible gear 1C in which one spiral slit 22a swirling in the circumferential direction C and extending in the z-axis direction is formed in each of the deformable portions 16a and 16b. Also in this case, the same effect as that in the third embodiment is obtained. The number of slits to be formed is not limited to one, and multiple slits may be formed.

Fourth Embodiment

Figure 9:
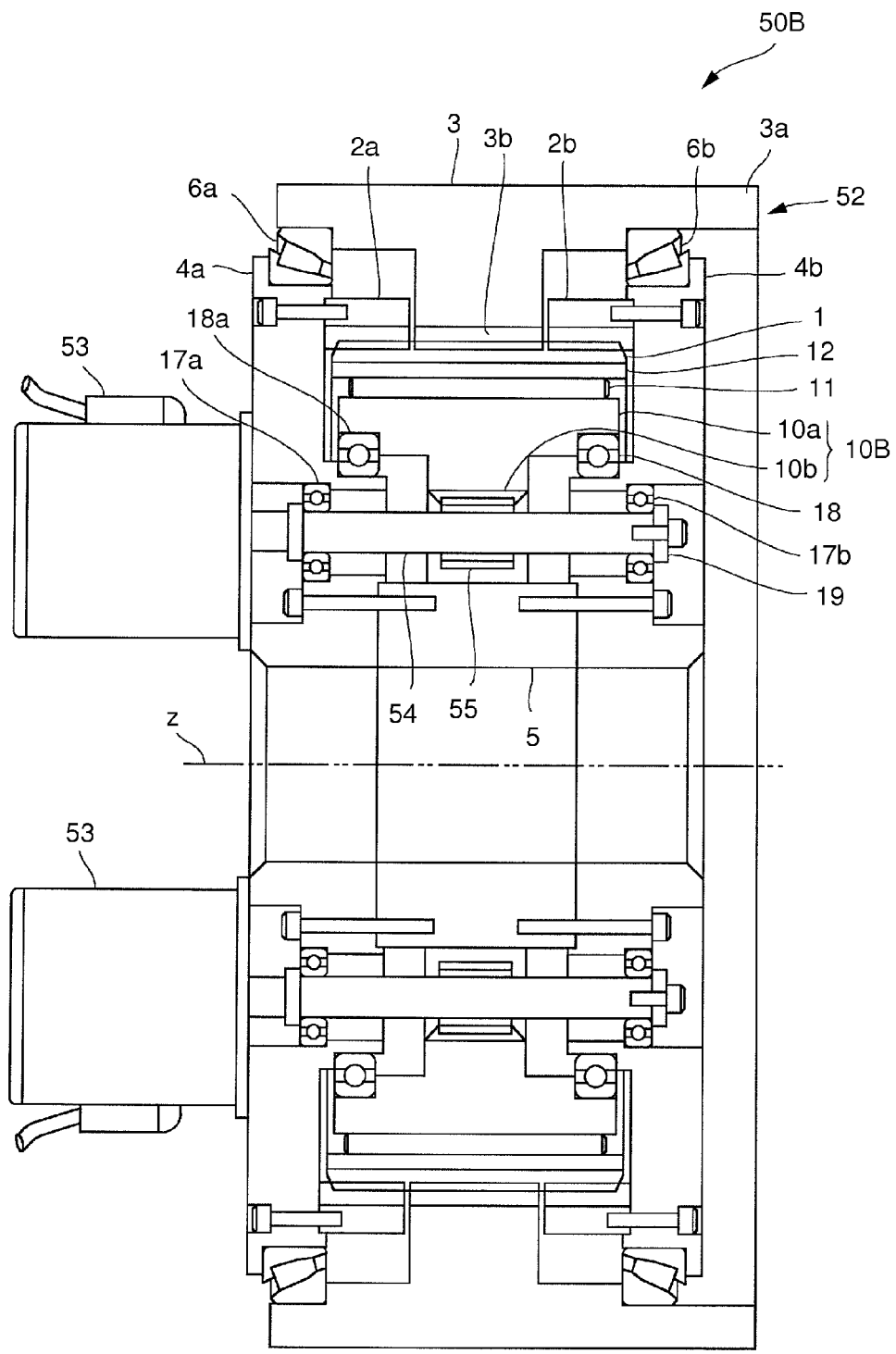
FIG. 9 is a schematic view illustrating schematic structure of a strain wave gearing according to a fourth embodiment of the present invention.

A strain wave gearing according to a fourth embodiment of the present invention is described. The fourth embodiment is different from the first to third embodiments in the mounting structure of the electric motor of the strain wave gearing. Specifically, in the first to third embodiments, the electric motor is arranged between the pair of fixing plates, but in the fourth embodiment, the electric motor is arranged outside the pair of fixing plates. FIG. 9 is a schematic view illustrating schematic structure of the strain wave gearing according to the fourth embodiment of the present invention. The same components as those in the first embodiment are represented by the same reference symbols, and description thereof is omitted herein.

In the fourth embodiment, as illustrated in FIG. 9, a strain wave gearing 50B includes multiple (in this embodiment, two) electric motors 53 and 53. The two electric motors 53 and 53 are symmetrically arranged across the z-axis. Each electric motor 53 is arranged outside the pair of fixing plates 4a and 4b. Specifically, each electric motor 53 is arranged in a region outside the region surrounded by the pair of fixing plates 4a and 4b. Further, each electric motor 53 is fixed to the one fixing plate 4a out of the pair of fixing plates 4a and 4b. The pair of fixing plates 4a and 4b are coupled to each other by the tubular shaft 5 centered on the z-axis.

A rotation shaft 54 of each electric motor 53 penetrates the one fixing plate 4a and protrudes into the region between the pair of fixing plates 4a and 4b. The rotation shaft 54 also penetrates the other fixing plate 4b. A base end portion of the rotation shaft 54 is supported in a rotatable manner through the intermediation of a bearing 17a arranged in the one fixing plate 4a. A leading end portion of the rotation shaft 54 is supported in a rotatable manner through the intermediation of a bearing 17b arranged in the other fixing plate 4b. The leading end portion of the rotation shaft 54 is pressed against the bearing 17b by a pressing plate 19.

A cam member 10B serving as a so-called wave generator includes a tubular cam portion 10a having its outer periphery formed into an elliptical shape and its inner periphery formed into a circular shape, and an internal gear 10b arranged in the center portion of the inner periphery of the cam portion 10a and having internal teeth formed so as to protrude into the inner side thereof. A gear (pinion gear) 55 is fixed to the rotation shaft 54 of each electric motor 53. The gear 55 engages with the internal teeth of the internal gear 10b of the cam member 10B. Further, a pair of bearings 18a and 18b are provided between the inner periphery of the cam portion 10a of the cam member 10B and the pair of fixing plates 4a and 4b, and the cam member 10B is supported so as to be rotatable about the z-axis.

In the above-mentioned structure, when power is supplied to the electric motors 53 and 53, a rotational force is generated, which causes the rotation shafts 54 and the gears 55 to rotate. The cam member 10B engaging with the gears 55 rotates by the rotation of the gears 55. The two engagement positions in the direction of the major axis of the ellipse, between the flexible gear 1 and the first internal gear 3b and between the flexible gear 1 and the pair of second internal gears 2a and 2b, rotate by the rotation of the cam member 10B. One revolution of the cam member 10B causes a relative rotation between the first internal gear 3b and the pair of second internal gears 2a and 2b with the shift corresponding to the difference in number of teeth between the first internal gear 3b and the pair of second internal gears 2a and 2b. In a case where the fixing plate 4a (4b) is fixed to the fixed object (not shown), the pair of second internal gears 2a and 2b coupled thereto does not rotate with respect to the fixed object, but instead the first internal gear 3b rotates with respect to the fixed object at the reduction ratio that is set based on the difference in number of teeth. For example, one revolution of the cam member 10B causes the first internal gear 3b to rotate relative to the pair of second internal gears 2a and 2b with the shift of two teeth (difference in number of teeth), that is, a 2/100 revolution. When assuming that the reduction ratio between the rotation shaft 54 of the electric motor 53 and the internal gear 10b of the cam member 10B is 10, a still higher reduction ratio of 1:500 can be realized as a whole. Specifically, in the fourth embodiment, the speed is reduced depending on the number of teeth of the gear 55 fixed to the rotation shaft 54 and the number of teeth of the internal gear 10b of the cam member 10B, and hence the still higher reduction ratio can be realized.

Because the cam member 10B rotates by combining the torque generated by the multiple electric motors 53 and 53, a high rotational force may be generated even when a small motor is used. The fourth embodiment has described the case where two electric motors are mounted, but the number of electric motors is not limited thereto. One or more electric motors are only necessary, and even when the number of electric motors is changed, the same effect as the strain wave gearing reducer is obtained. Mounting more electric motors enables each electric motor to be further downsized. Conversely, design of providing one electric motor is also applicable.

As described above, according to the fourth embodiment, the electric motors 53 and 53 are arranged outside the strain wave gearing reducer 52, and hence a higher-power motor can be used as compared to the built-in electric motor used in the first to third embodiments. Further, the multiple electric motors 53 and 53 can be arranged, and hence still higher power can be output. In particular, as an application example, when it is applied to the first axis of a base of a robotic arm, a high-speed robotic arm can be provided.

The fourth embodiment has described the case where the structure of the strain wave gearing reducer is the same as that of the strain wave gearing reducer 52 in the first embodiment, but the structure may be the same as that of the strain wave gearing reducer 52A in the second embodiment. Also in this case, the same effect is obtained.

Fifth Embodiment

Figure 10:
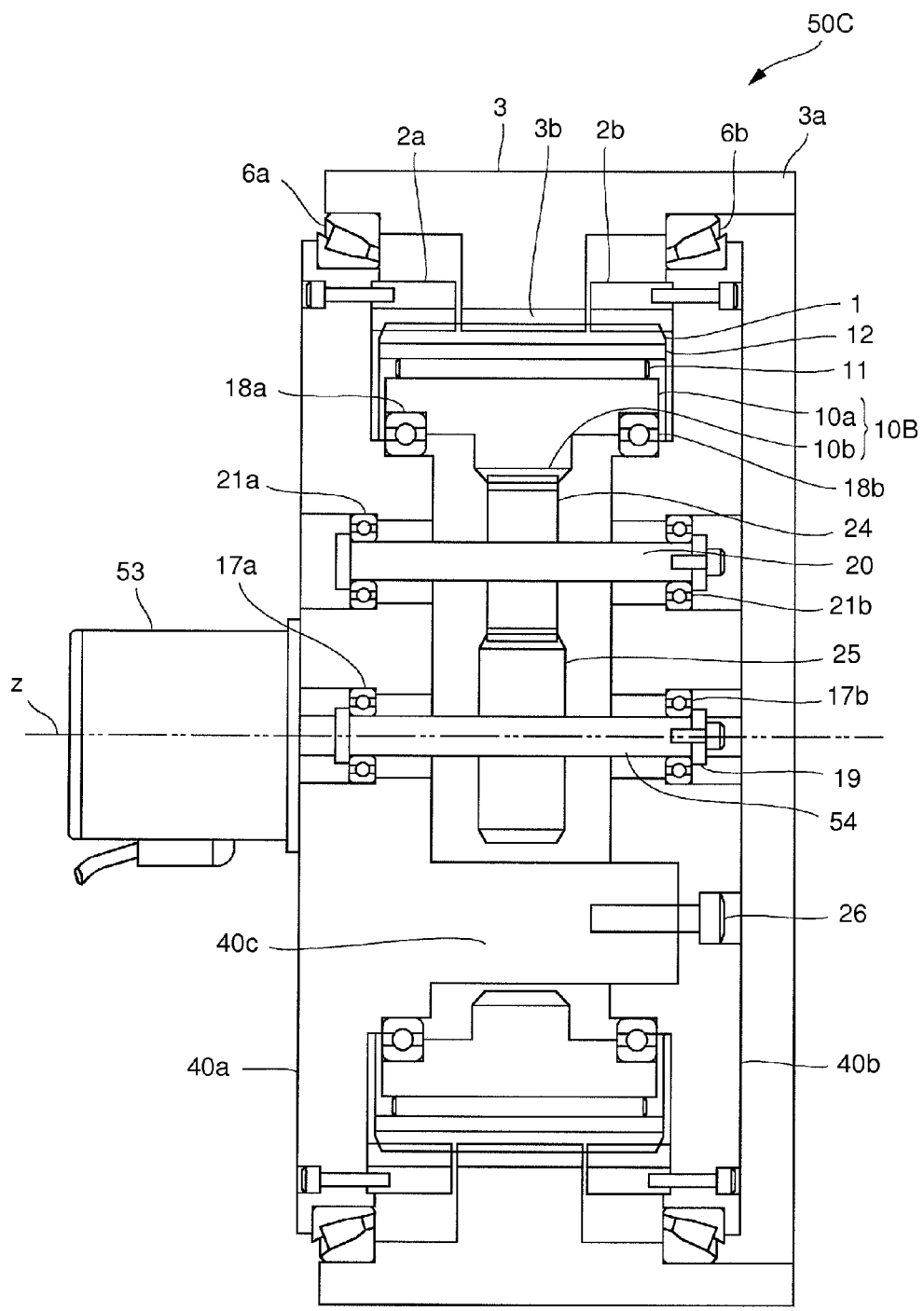
FIG. 10 is a schematic view illustrating schematic structure of a strain wave gearing according to a fifth embodiment of the present invention.

A strain wave gearing according to a fifth embodiment of the present invention is described. The fifth embodiment is different from the first to fourth embodiments (in particular, fourth embodiment) in the transmission mechanism for transmitting the rotational force of the electric motor to the cam member. Specifically, the fourth embodiment has described the mechanism in which the rotational force of the gear fixed to the rotation shaft of the electric motor is directly transmitted to the internal gear of the cam member, but the fifth embodiment describes a case where a planetary gearing mechanism is used. FIG. 10 is a schematic view illustrating schematic structure of the strain wave gearing according to the fifth embodiment of the present invention. The same components as those in the fourth embodiment are represented by the same reference symbols, and description thereof is omitted herein.

A strain wave gearing 50C includes one electric motor 53. The electric motor 53 includes the rotation shaft 54 that rotates about the z-axis, and is arranged outside a pair of fixing plates 40a and 40b and fixed to the one fixing plate 40a out of the pair of fixing plates 40a and 40b. The base end portion of the rotation shaft 54 is supported in a rotatable manner through the intermediation of the bearing 17a arranged in the one fixing plate 40a. The leading end portion of the rotation shaft 54 is supported in a rotatable manner through the intermediation of the bearing 17b arranged in the other fixing plate 40b. The leading end portion of the rotation shaft 54 is pressed against the bearing 17b by the pressing plate 19.

In the fifth embodiment, the electric motor 53 is arranged on the z-axis, and hence a coupling member 40c is formed integrally with the one fixing plate 40a out of the pair of fixing plates 40a and 40b, at a position other than the z-axis. The other fixing plate 40b is coupled to the coupling member 40c by means of a bolt 26. In other words, the pair of fixing plates 40a and 40b are coupled to each other by the coupling member 40c penetrating the cam member 10B. In other words, the coupling member 40c couples the pair of fixing plates 40a and 40b to each other through a space surrounded by the inner periphery of the cam member 10B.

A sun gear 25 is provided to the rotation shaft 54 of the electric motor 53, and multiple planet gears 24 are provided between external teeth of the sun gear 25 and the internal teeth of the internal gear 10b of the cam member 10B. Each planet gear 24 engages with the external teeth of the sun gear 25 and the internal teeth of the internal gear 10b of the cam member 10B. Note that, FIG. 10 illustrates one planet gear 24 alone but does not illustrate the other planet gears.

Each planet gear 24 is fixed to a rotation shaft 20. The rotation shaft 20 to which the planet gear 24 is fixed is supported by the fixing plates 40a and 40b in a state in which the rotation shaft 20 cannot revolve around the sun gear 25, and further supported by the fixing plates 40a and 40b through the intermediation of bearings 21a and 21b in a state in which the rotation shaft 20 can rotate on its axis. In other words, the rotational force of the electric motor 53 is transmitted to the cam member 10B through the sun gear 25 and the planet gears 24, and accordingly the cam member 10B rotates.

Similarly to the fourth embodiment, the cam member 10B is supported in a rotatable manner by the fixing plates 40a and 40b through the intermediation of the bearings 18a and 18b. Further, the outer ring portion 3a of the outer ring member 3 is supported in a rotatable manner by the fixing plates 40a and 40b through the intermediation of the bearings 6a and 6b.

When power is supplied to the electric motor 53, a rotational force is generated, which causes the sun gear to rotate and thereby causes the planet gears 24 engaging therewith to rotate (on its axis). Then, the cam member 10B engaging with the planet gears 24 rotates. In the fifth embodiment, the sun gear 25, the planet gears 24, and the cam member 10B including the internal gear 10b constitute a planetary gearing reduction mechanism. Accordingly, the rotation of the electric motor 53 is transmitted to the cam member 10B while the speed thereof is reduced, and thus a high reduction ratio can be realized. For example, when assuming that the reduction ratio between the flexible gear 1 serving as the flex spline and the strain wave gearing reducer portion including the internal gear is 1:50, and that the reduction ratio between the rotation shaft 54 of the electric motor 53 and the cam member 10B is 10, a high reduction ratio of 1:500 can be realized.

Because the electric motor 53 is arranged outside the strain wave gearing reducer, a larger motor can be used. In particular, the first axis of an industrial robotic arm requires a large rotational force, and hence applying the strain wave gearing 50C of the fifth embodiment is effective.

The fifth embodiment has described the case where the structure of the strain wave gearing reducer is substantially the same as that of the strain wave gearing reducer 52 in the first embodiment, but the structure may be substantially the same as that of the strain wave gearing reducer 52A in the second embodiment. Also in this case, the same effect is obtained.

Sixth Embodiment

Figure 11:
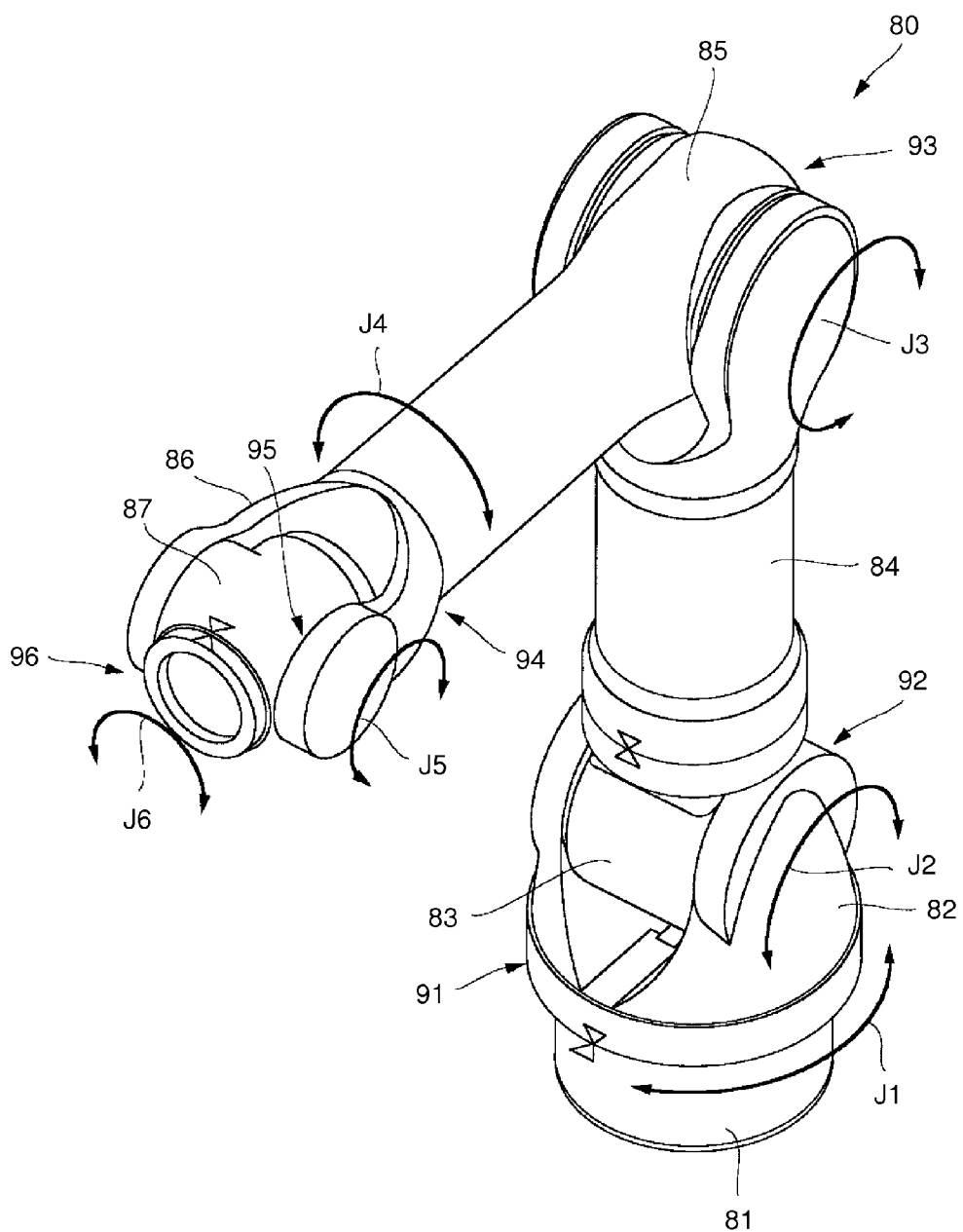
FIG. 11 is an explanatory view illustrating schematic structure of a robotic arm according to a sixth embodiment of the present invention.

A robotic arm including the strain wave gearing according to a sixth embodiment of the present invention is described. The robotic arm of the sixth embodiment includes any one of the strain wave gearings according to the first to fifth embodiments. FIG. 11 illustrates schematic structure of a robotic arm 80. The robotic arm 80 includes multiple links 81 to 87, and joints 91 to 96 coupling a pair of adjacent links to each other, in each of which any one of the strain wave gearings described in the first to fifth embodiments is arranged. In other words, any one of the strain wave gearings according to the first to fifth embodiments only needs to be applied depending on the structure of the joint. The robotic arm 80 is an example of robots frequently used for industrial application. In FIG. 11, rotation directions of the links 81 to 87 of the respective joints 91 to 96 are represented by J1 to J6, and the links 81 to 87 are connected in series. Hence, the stiffnesses of the strain wave gearing reducers of the strain wave gearings in the respective joints are also connected in series, and therefore the stiffness at the leading end of the robot tends to be low. To address this, a high stiffness is necessary particularly for the joints 91 and 92 near the base of the robot. This is because the distance from the leading end portion of the robot is large and therefore even a disturbance force of the same level becomes large disturbance torque for the joints 91 and 92 near the base, especially for the joint 91.

Figure 12:
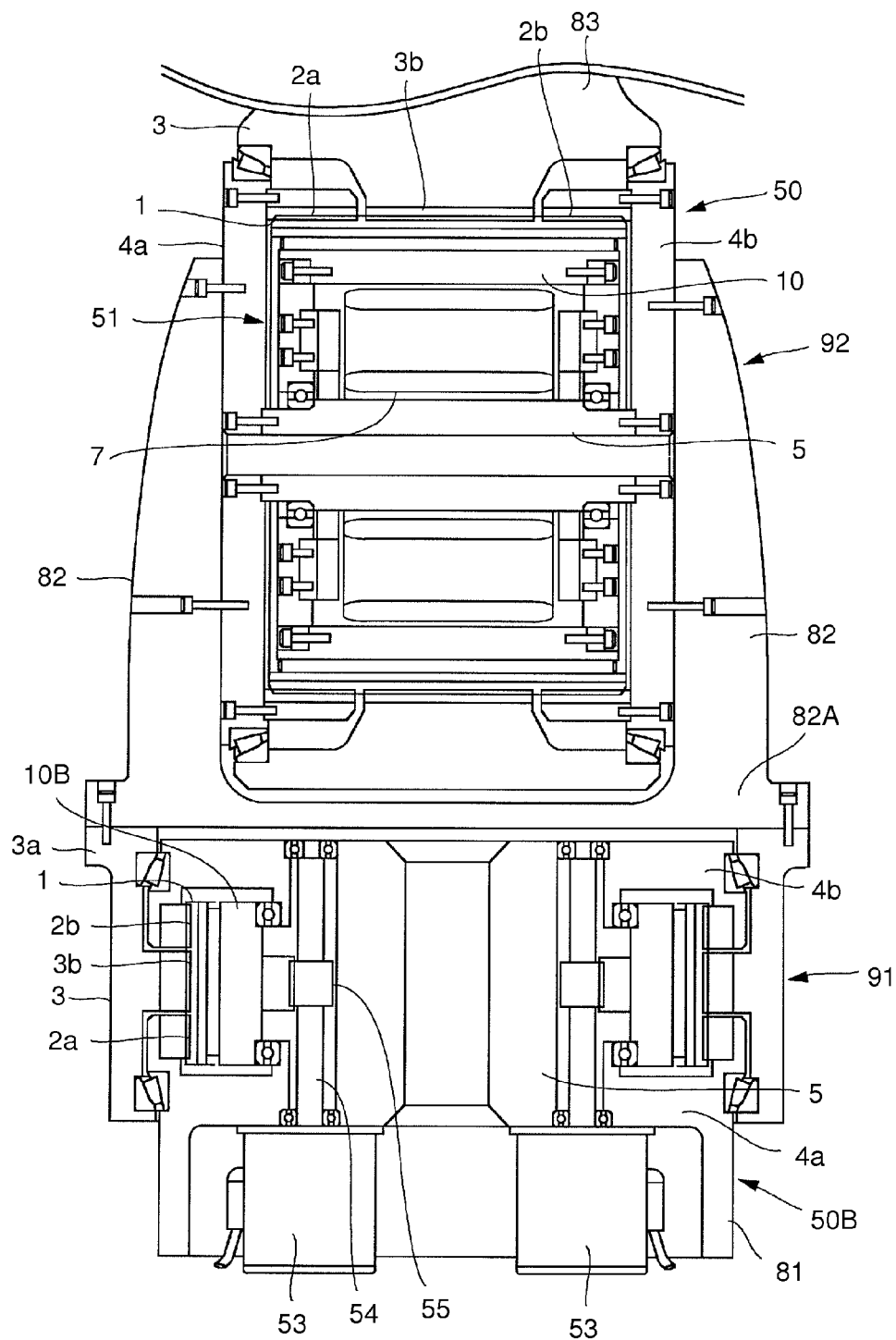
FIG. 12 illustrates an example in which the strain wave gearings of the first and fourth embodiments are applied to joints of the robotic arm according to the sixth embodiment of the present invention, which are situated near a base thereof.

FIG. 12 illustrates an example in which the strain wave gearings 50B and 50 of the above-mentioned embodiments are applied to the joints 91 and 92 near the base, respectively. The structure of the strain wave gearing 50B is as described in the fourth embodiment, and the structure of the strain wave gearing 50 is as described in the first embodiment. The strain wave gearing 50B is provided in the joint 91 between the first link 81 and the second link 82, and the strain wave gearing 50 is provided in the joint 92 between the second link 82 and the third link 83.

The fixing plate 4a of the strain wave gearing 50B is fixed to the first link 81. The outer ring member 3 of the strain wave gearing 50B is fixed to a stay 82A of the second link 82, and the second link 82 can therefore rotate with respect to the first link 81. In the above-mentioned structure, when the electric motors 53 of the strain wave gearing 50B rotate, the rotation shafts 54 rotate and thereby the cam member 10B engaging with the gears 55 rotates. The engagement positions between the flexible gear 1 and the internal gear 3b of the outer ring member 3 change, which causes the outer ring member 3 to rotate with respect to the fixing plates 40a and 40b by the rotation of the cam member 10B. As a result, the second (one) link 82 can rotate more than one revolution with respect to the first (other) link 81. The strain wave gearing reducer of the strain wave gearing 50B has a high stiffness, which leads to a stable rotational operation of the second link 82 and ensures more than one revolution.

Meanwhile, the fixing plates 4a and 4b of the strain wave gearing 50 are fixed to the stay 82A of the second link 82. The outer ring member 3 of the strain wave gearing 50 is fixed to the third link 83, and the third link 83 can therefore rotate with respect to the second link 82. In the above-mentioned structure, when power is supplied to the electric motor 51 of the strain wave gearing 50, the cam member 10 rotates. The engagement positions between the flexible gear 1 and the internal gear 3b of the outer ring member 3 change by the rotation of the cam member 10, which causes the outer ring member 3 to rotate with respect to the fixing plates 4a and 4b. As a result, the third (one) link 83 can rotate with respect to the second (other) link 82. The strain wave gearing reducer of the strain wave gearing 50 has a high stiffness, which leads to a stable rotational operation of the third link 83.

In the sixth embodiment, the strain wave gearing 50B having a higher reduction ratio than the strain wave gearing 50 is applied to the joint 91 which requires a large rotational force. Accordingly, the operation of the robotic arm 80 becomes stable. In particular, the strain wave gearing 50B includes the multiple electric motors 53 and 53, and thus a larger rotational force can be generated.

The present invention has been described based on the above-mentioned first to sixth embodiments, but the present invention is not limited thereto. The first to sixth embodiments have described the case where the contour of the cam member is an elliptical shape, but the shape does not exactly need to be an ellipse as long as the flexible gear can be deformed to be pressed against the internal gear of the outer ring member. For example, a track shape, in which two eccentric circles and their common tangents are connected, is also applicable.

The above-mentioned first to fourth embodiments have described the case where the shaft 5 serving as the coupling member is provided separately from the pair of fixing plates 4a and 4b and coupled thereto by means of bolts or the like. Alternatively, the coupling member may be formed integrally with the fixing plates when coupled. Still alternatively, the fixing plates 4a and 4b and the internal gears 2a and 2b, or the fixing plates 4a and 4b and the flexible gear including the flange portions may be formed integrally. In other words, as described in the above-mentioned first to fourth embodiments, the members to be coupled and fixed to each other may be formed integrally.

In the above-mentioned fifth embodiment, the coupling member 40c is formed integrally with the one fixing plate 40a, but the present invention is not limited thereto. The coupling member 40c may be formed integrally with the other fixing plate 40b. Further, the coupling member 40c may be formed separately from both the fixing plates 40a and 40b and coupled thereto by means of bolts or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-087482, filed Apr. 6, 2010, which is hereby incorporated by reference herein in its entirety.

What is claimed is:

1. A strain wave gearing, comprising:

an electric motor;

an outer ring member for rotation output having a tubular outer ring portion, and an internal gear which is provided so as to protrude into an inner side of the outer ring portion and has internal teeth formed along an inner periphery of the internal gear;

a flexible gear having an external gear which has external teeth formed along an outer periphery of the external gear and is arranged on an inner side of the internal gear, the flexible gear formed of a tubular flexible member which has a pair of flange portions arranged on both end sides of the external gear, a number of the external teeth of the external gear differing from a number of the internal teeth of the internal gear;

a tubular cam member configured to distort the flexible gear in a radial direction so as to partially engage the external gear with the internal gear, the tubular cam member rotated by a rotational force transmitted from the electric motor so as to move engagement positions in a circumferential direction so that a relative rotation between the internal gear and the external gear is generated;

a pair of fixing plates, to each of which a corresponding flange portion of the pair of flange portions is fixed; and a coupling member penetrating the tubular cam member and coupling the pair of fixing plates to each other, wherein the flexible gear has a pair of deformable portions and each of the deformable portions has at least one spiral slit which is formed in a plate-like portion connecting the external gear to the corresponding flange portion which swirls in the circumferential direction of the flexible gear and extends in an axial direction wherein each deformable portion of which is formed between the external gear and each of the pair of flange portions, and to be deformed by being pressed by the tubular cam member so that the external gear protrudes in the radial direction.

* * * * *